United States Patent
Choi et al.

(10) Patent No.: US 10,290,923 B2
(45) Date of Patent: May 14, 2019

(54) ELECTRONIC DEVICE INCLUDING ANTENNA DEVICE

(71) Applicant: Samsung Electronics Co., Ltd., Gyeonggi-do (KR)

(72) Inventors: Dong-Uk Choi, Gyeonggi-do (KR); Sang-Pil Lee, Gyeonggi-do (KR); Jangje Park, Gyeonggi-do (KR); Jinu Kim, Seoul (KR); Bumjin Cho, Gyeonggi-do (KR); Inyong Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 140 days.

(21) Appl. No.: 15/217,411

(22) Filed: Jul. 22, 2016

(65) Prior Publication Data
US 2017/0033442 A1 Feb. 2, 2017

(30) Foreign Application Priority Data

Jul. 31, 2015 (KR) .................. 10-2015-0109186

(51) Int. Cl.
| | |
|---|---|
| *H01Q 1/24* | (2006.01) |
| *G06F 3/044* | (2006.01) |
| *H01Q 1/38* | (2006.01) |
| *H04W 88/06* | (2009.01) |

(52) U.S. Cl.
CPC ............ *H01Q 1/243* (2013.01); *G06F 3/044* (2013.01); *H01Q 1/24* (2013.01); *H01Q 1/38* (2013.01); *H04W 88/06* (2013.01)

(58) Field of Classification Search
CPC ......... H04W 88/06; H01Q 1/243; H01Q 1/48; H01Q 5/001; H01Q 1/24; H01Q 1/38; G06F 3/044

USPC ................. 343/702, 904; 455/41.1
See application file for complete search history.

(56) References Cited

U.S. PATENT DOCUMENTS

| | | | | |
|---|---|---|---|---|
| 2012/0214412 | A1* | 8/2012 | Schlub ............ | G01B 7/023 455/41.1 |
| 2013/0100030 | A1* | 4/2013 | Los ................. | G06F 3/023 345/169 |
| 2013/0267284 | A1* | 10/2013 | Ryu ................. | H04W 88/06 455/575.7 |

FOREIGN PATENT DOCUMENTS

KR           10-0720939           5/2007

* cited by examiner

*Primary Examiner* — Hai V Tran
(74) *Attorney, Agent, or Firm* — The Farrell Law Firm, P.C.

(57) ABSTRACT

An electronic device is provided. The electronic device includes a housing including a window that forms a first side of the electronic device, and a second side that is disposed opposite to the first side, a touch sensor disposed adjacent to the window and configured to generate a capacitance, an input circuit operably connected to the touch sensor and configured to detect an input based on a variation in the capacitance, an antenna radiator at least one of partially disposed inside the housing and a part of the housing, a ground operably disposed between the first side and the second side, a communication circuit operably connected to the antenna radiator and the ground, and an antenna matching circuit operably connected to the touch sensor and the input circuit.

16 Claims, 20 Drawing Sheets

ELECTRONIC DEVICE INCLUDING ANTENNA DEVICE

PRIORITY

This application claims priority under 35 U.S.C. § 119(a) to Korean Patent Application Serial No. 10-2015-0109186, which was filed in the Korean Intellectual Property Office on Jul. 31, 2015, the entire content of which is incorporated herein by reference.

BACKGROUND

1. Field of the Disclosure

The present disclosure relates generally to an electronic device, and more particularly, to an electronic device that includes a metal member around an antenna radiator of an antenna device, thereby reducing a degradation in antenna performance.

2. Description of the Related Art

Electronic devices may be equipped with at least one antenna that is suitable for an individual service, such as location tracing, wireless communication, global roaming, etc. With the slimness of electronic devices and an increase in the number of components that are equipped to the electronic devices for multiple functions, it may be difficult to ensure antenna performance, which is an important factor of wireless mobile communication.

Accordingly, when an antenna is mounted on a user device with inadequate space, as a result of too many peripheral elements being provided on the user device, antenna performance may be degraded.

SUMMARY

Aspects of the present disclosure provide an electronic device having a wireless communication function that can ensure antenna performance of an antenna device.

In accordance to an aspect of the present disclosure, there is provided an electronic device. The electronic device includes a housing including a window that forms a first side of the electronic device, and a second side that is disposed opposite to the first side, a touch sensor disposed adjacent to the window and configured to generate a capacitance, an input circuit operably connected to the touch sensor and configured to detect an input based on a variation in the capacitance, an antenna radiator at least one of partially disposed inside the housing and a part of the housing, a ground operably disposed between the first side and the second side, a communication circuit operably connected to the antenna radiator and the ground, and an antenna matching circuit operably connected to the touch sensor and the input circuit.

In accordance to another aspect of the present disclosure, there is provided an electronic device. The electronic device includes a housing that includes a window that forms a first side of the electronic device, and a second side of the electronic device that is disposed opposite to the first side, a circuit board operably disposed between the first side of the electronic device and the second side of the electronic device and including a ground, a first conductive plate and a second conductive plate that are operably disposed between the first side of the electronic device and the circuit board and that are disposed adjacent to and spaced apart from the window, an input circuit mounted on the circuit board and configured to detect a first input based on a variation in a capacitance of the first conductive plate and to detect a second input based on a variation in a capacitance of the second conductive plate and, a first contact and a second contact, the first contact mounted on the circuit board and configured to electrically connect the input circuit and the first conductive plate and the second contact mounted on the circuit board and configured to electrically connect the input circuit and the second conductive plate, an antenna radiator at least one of partially disposed inside the housing and a part of the housing, a communication circuit mounted on the circuit board and operably connected to the antenna radiator and the ground, and an antenna matching circuit mounted on the circuit board and operably connected to at least one of the first conductive plate and the second conductive plate and the input circuit.

In accordance with another aspect of the present disclosure, there is provided a method for operating an electronic device. The method includes electrically connecting an antenna radiator of the electronic device to a communication circuit of the electronic device and electrically connecting an antenna matching circuit of the electronic device to a touch sensor of the electronic device and an input circuit of the electronic device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
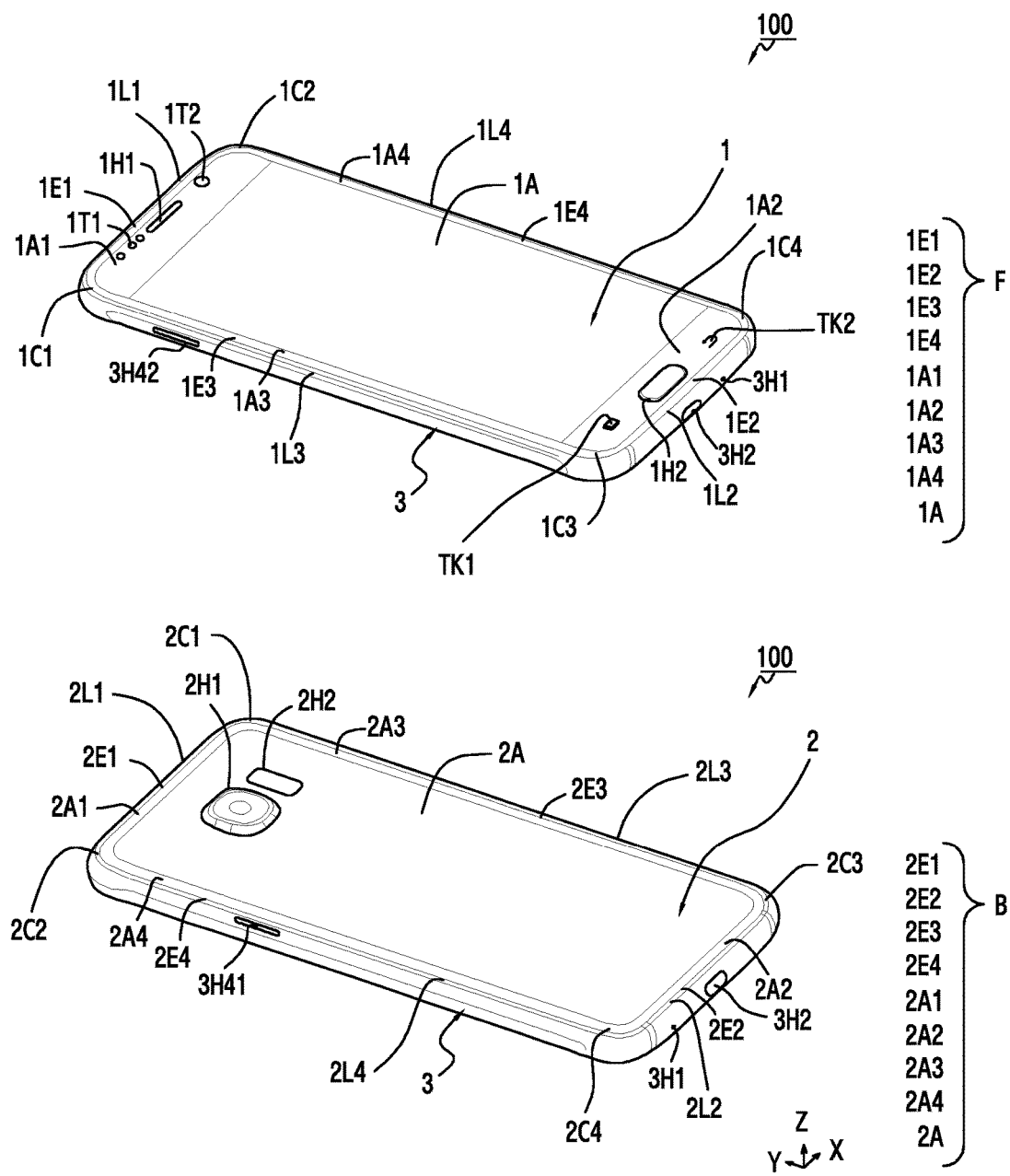
FIG. 1 is a diagram illustrating an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms and words used in the following description and claims are not limited to their dictionary meanings, but are merely used to enable a clear and consistent understanding of the present disclosure. Accordingly, it should be apparent to those skilled in the art that the following description is provided for illustration purposes only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may be understood to imply that the device, together with other devices or components, "is able to" perform. For example, the phrase "processor adapted (or configured) to perform A, B, and C" may mean a dedicated processor (e.g. embedded processor) for performing only the corresponding operations, or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings similar to the contextual meanings in the relevant field of art, and are not to be interpreted to have ideal or excessively formal meanings unless clearly defined in the present disclosure. In some cases, a term defined in the present disclosure should not be interpreted to exclude embodiments of the present disclosure. Moreover, unless specified to the contrary, elements of different embodiments may be interchanged.

An electronic device of the present disclosure may include at least one of, for example, a smart phone, tablet personal computer (PC), mobile phone, video phone, electronic book reader (e-book reader), desktop PC, laptop PC, netbook computer, workstation, server, personal digital assistant (PDA), portable multimedia player (PMP), moving picture experts group (MPEG-1 or MPEG-2) audio layer-3 (MP3) player, mobile medical device, camera, and wearable device. The wearable device may include at least one of an accessory type (e.g., a watch, ring, bracelet, anklet, necklace, glasses, contact lens, or head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television (TV), digital versatile disc (DVD) player, audio player, refrigerator, air conditioner, vacuum cleaner, oven, microwave oven, washing machine, air cleaner, set-top box, home automation control panel, security control panel, TV box (e.g., Samsung HomeSync™, Apple TV™, or Google TV™), game console (e.g., Xbox™ and Play Station™), electronic dictionary, electronic key, camcorder, and electronic photo frame.

The electronic device may include at least one of various medical devices (e.g., various portable medical measuring devices (a blood glucose monitoring device, heart rate monitoring device, blood pressure measuring device, body temperature measuring device, etc.), a magnetic resonance angiography (MRA), magnetic resonance imaging (MRI) device, computed tomography (CT) machine, and ultrasonic machine), a navigation device, global positioning system (GPS) receiver, event data recorder (EDR), flight data recorder (FDR), vehicle infotainment devices, electronic devices for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things (IoT) devices (e.g., a light bulb, various sensors, electric or gas meter, sprinkler device, fire alarm, thermostat, streetlamp, toaster, sporting goods, hot water tank, heater, boiler, etc.).

The electronic device may include at least one of a part of furniture or building/structure, an electronic board, electronic signature receiving device, projector, and various kinds of measuring instruments (e.g., a water meter, electric meter, gas meter, and radio wave meter). The electronic device may be a combination of one or more of the aforementioned various devices. The electronic device may be a flexible device. Further, an electronic device is not limited to the aforementioned devices and may include a new electronic device according to technological advances.

Hereinafter, an electronic device will be described with reference to the accompanying drawings. As used herein, the term "user" may refer to a person who uses an electronic device, or a device (e.g., an artificial intelligence electronic device) that uses an electronic device.

Figure 2:
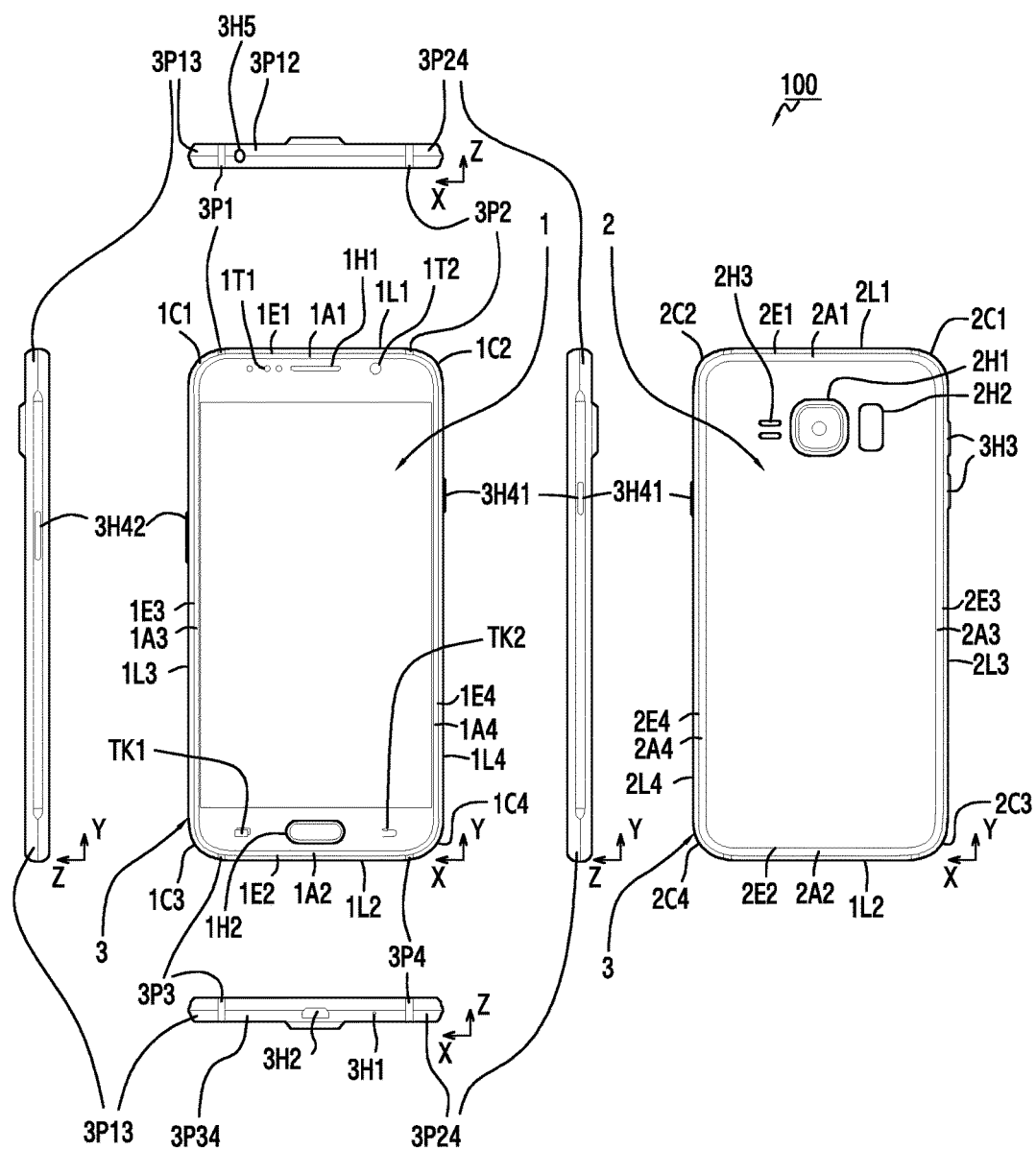
FIG. 2 is a diagram illustrating an electronic device, when viewed in various directions, according to the embodiment of the present disclosure.

FIG. 1 is a diagram illustrating an electronic device, according to an embodiment of the present disclosure. FIG. 2 is a diagram illustrating the electronic device, according to the embodiment of the present disclosure.

Referring to FIGS. 1 and 2, the electronic device 100 may have a substantially rectangular shape and may include a front cover 1 that forms the front F thereof and a back cover 2 that forms the back B thereof. Further, the electronic device 100 may include a bezel 3 that surrounds the space between the front cover 1 and the back cover 2. In addition, the electronic device 100 may include a display that is embedded in the space formed by the front cover 1 and the back cover 2. Here, the screen area of the display may be shown to the outside through the front cover 1.

The front cover 1 and/or the back cover 2 may be formed of glass.

The bezel 3 may be formed of non-metal or metal.

The front F of the electronic device 100 may include a first edge 1E1, a second edge 1E2, a third edge 1E3, and a fourth edge 1E4. The first edge 1E1 and the second edge 1E2 may be opposite to each other, and the third edge 1E3 and the fourth edge 1E4 may be opposite to each other. The third edge 1E3 may connect one end portion of the first edge 1E1 and one end portion of the second edge 1E2. The fourth edge 1E4 may connect the other end portion of the first edge 1E1 and the other end portion of the second edge 1E2.

The first edge 1E1, the second edge 1E2, the third edge 1E3, or the fourth edge 1E4 may be linear as illustrated in the drawings, or may be curvilinear without being limited thereto.

The front cover 1 may include a first area 1A1 adjacent to the first edge 1E1. The front cover 1 may include a second area 1A2 adjacent to the second edge 1E2. The first area 1A1 and the second area 1A2 may be symmetric to each other.

The front cover 1 may include a third area 1A3 adjacent to the third edge 1E3. The front cover 1 may include a fourth area 1A4 adjacent to the fourth edge 1E4. The third area 1A3 and the fourth area 1A4 may be symmetric to each other.

At least one of the first area 1A1, the second area 1A2, the third area 1A3, and the fourth area 1A4 may include a curved surface. Alternatively, at least one of the first area 1A1, the second area 1A2, the third area 1A3, and the fourth area 1A4 may be a flat surface with a predetermined gradient.

The front F of the electronic device 100 may include a central area 1A that is surrounded by the first area 1A1, the second area 1A2, the third area 1A3, and the fourth area 1A4.

The central area 1A may have the shape of a (right-angled) quadrangle as illustrated in the drawings, but is not limited thereto. Further, the central area 1A may include a flat surface and/or a curved surface.

The screen area of the display may be overlaid with the central area 1A of the front F of the electronic device 100, and may not overlap the first area 1A1, the second area 1A2, the third area 1A3, and the fourth area 1A4.

The bezel 3 may include a first corner portion 1C1 near where the first edge 1E1 and the third edge 1E3 are connected to each other. The bezel 3 may include a second corner portion 1C2 near where the first edge 1E1 and the fourth edge 1E4 are connected to each other. The bezel 3 may include a first connecting portion 1L1 that connects the first corner portion 1C1 and the second corner portion 1C2. The first connecting portion 1L1 may further protrude beyond the first corner portion 1C1 and/or the second corner portion 1C2 in the direction from the back B to the front F of the electronic device 100. For example, when viewed in the section, at least a part of the first corner portion 1C1 and/or the second corner portion 1C2 may be thinner than the first connecting portion 1L1 in the direction from the back B to the front F of the electronic device 100.

The bezel 3 may include a third corner portion 1C3 near where the second edge 1E2 and the third edge 1E3 are connected to each other. The bezel 3 may include a fourth corner portion 1C4 near where the second edge 1E2 and the fourth edge 1E4 are connected to each other. Further, the bezel 3 may include a second connecting portion 1L2 that connects the third corner portion 1C3 and the fourth corner portion 1C4. The second connecting portion 1L2 may further protrude beyond the third corner portion 1C3 and/or the fourth corner portion 1C4 in the direction from the back B to the front F of the electronic device 100. For example, when viewed in the section, at least a part of the third corner portion 1C3 and/or the fourth corner portion 1C4 may be thinner than the second connecting portion 1L2 in the direction from the back B to the front F of the electronic device 100.

The bezel 3 may include a third connecting portion 1L3 that connects the first corner portion 1C1 and the third corner portion 1C3. The third connecting portion 1L3 may further protrude beyond the first corner portion 1C1 and/or the third corner portion 1C3 in the direction from the back B to the front F of the electronic device 100. For example, when viewed in the section, at least a part of the first corner portion 1C1 and/or the third corner portion 1C3 may be thinner than the third connecting portion 1L3 in the direction from the back B to the front F of the electronic device 100.

The bezel 3 may include a fourth connecting portion 1L4 that connects the second corner portion 1C2 and the fourth corner portion 1C4. The fourth connecting portion 1L4 may further protrude beyond the second corner portion 1C2 and/or the fourth corner portion 1C4 in the direction from the back B to the front F of the electronic device 100. For example, when viewed in the section, the second corner portion 1C2 and/or the fourth corner portion 1C4 may be thinner than the fourth connecting portion 1L4 in the direction from the back B to the front F of the electronic device 100.

The corner portions 1C1, 1C2, 1C3, and 1C4 may be rounded so as to be smoothly connected to the connecting portions 1L1, 1L2, 1L3, and 1L4.

The corner portions 1C1, 1C2, 1C3, and 1C4 may protrude relative to the connecting portions 1L1, 1L2, 1L3, and 1L4 in the direction perpendicular to that from the back B to the front F of the electronic device 100. For example, when viewed in the section, the corner portions 1C1, 1C2, 1C3, and 1C4 may be thicker than the connecting portions 1L1, 1L2, 1L3, and 1L4 in the direction perpendicular to that from the back B to the front F of the electronic device 100. For example, the above-described protruding shapes may reduce damage caused by a drop of the electronic device 100.

The back B of the electronic device 100 may include a first edge 2E1, a second edge 2E2, a third edge 2E3, and a fourth edge 2E4. The first edge 2E1 and the second edge 2E2 may be opposite to each other, and the third edge 2E3 and the fourth edge 2E4 may be opposite to each other. The third edge 2E3 may connect one end portion of the first edge 2E1 and one end portion of the second edge 2E2. The fourth edge 2E4 may connect the other end portion of the first edge 2E1 and the other end portion of the second edge 2E2.

The first edge 2E1, the second edge 2E2, the third edge 2E3, or the fourth edge 2E4 may be linear as illustrated in the drawings, or may be curvilinear without being limited thereto.

The back cover 2 may include a first area 2A1 adjacent to the first edge 2E1. The back cover 2 may include a second area 2A2 adjacent to the second edge 2E2. The first area 2A1 and the second area 2A2 may be symmetric to each other.

The back cover 2 may include a third area 2A3 adjacent to the third edge 2E3. The back cover 2 may include a fourth area 2A4 adjacent to the fourth edge 2E4. The third area 2A3 and the fourth area 2A4 may be symmetric to each other.

At least one of the first area 2A1, the second area 2A2, the third area 2A3, and the fourth area 2A4 may include a curved surface. Alternatively, at least one of the first area 2A1, the second area 2A2, the third area 2A3, and the fourth area 2A4 may be a flat surface with a predetermined gradient. In another case, at least one of the first area 2A1, the second area 2A2, the third area 2A3, and the fourth area 2A4 may be a combination of flat surfaces with different gradients.

The back B of the electronic device 100 may include a central area 2A that is surrounded by the first area 2A1, the second area 2A2, the third area 2A3, and the fourth area 2A4.

The central area 2A may have the shape of a (right-angled) quadrangle as illustrated in the drawings, but is not limited thereto. Further, the central area 2A may include a flat surface and/or a curved surface.

The screen area of the display may be overlaid with the central area 2A of the back B of the electronic device 100, and may not overlap the first area 2A1, the second area 2A2, the third area 2A3, and the fourth area 2A4.

The bezel 3 may include a first corner portion 2C1 near where the first edge 2E1 and the third edge 2E3 are connected to each other. The bezel 3 may include a second corner portion 2C2 near where the first edge 2E1 and the fourth edge 2E4 are connected to each other. The bezel 3 may include a first connecting portion 2L1 that connects the first corner portion 2C1 and the second corner portion 2C2. The first connecting portion 2L1 may further protrude beyond the first corner portion 2C1 and/or the second corner portion 2C2 in the direction from the front F to the back B of the electronic device 100. For example, when viewed in the section, at least a part of the first corner portion 2C1 and/or the second corner portion 2C2 may be thinner than the first connecting portion 2L1 in the direction from the front F to the back B of the electronic device 100.

The bezel 3 may include a third corner portion 2C3 near where the second edge 2E2 and the third edge 2E3 are connected to each other. The bezel 3 may include a fourth corner portion 2C4 near where the second edge 2E2 and the fourth edge 2E4 are connected to each other. The bezel 3 may include a second connecting portion 2L2 that connects the third corner portion 2C3 and the fourth corner portion 2C4. The second connecting portion 2L2 may further protrude beyond the third corner portion 2C3 and/or the fourth corner portion 2C4 in the direction from the front F to the back B of the electronic device 100. For example, when viewed in the section, at least a part of the third corner portion 2C3 and/or the fourth corner portion 2C4 may be thinner than the second connecting portion 2L2 in the direction from the front F to the back B of the electronic device 100.

The bezel 3 may include a third connecting portion 2L3 that connects the first corner portion 2C1 and the third corner portion 2C3. Further, the third connecting portion 2L3 may further protrude beyond the first corner portion 2C1 and/or the third corner portion 2C3 in the direction from the front F to the back B of the electronic device 100. For example, when viewed in the section, at least a part of the first corner portion 2C1 and/or the third corner portion 2C3 may be thinner than the third connecting portion 2L3 in the direction from the front F to the back B of the electronic device 100.

The bezel 3 may include a fourth connecting portion 2L4 that connects the second corner portion 2C2 and the fourth corner portion 2C4. The fourth connecting portion 2L4 may further protrude beyond the second corner portion 2C2 and/or the fourth corner portion 2C4 in the direction from the front F to the back B of the electronic device 100. For example, when viewed in the section, the second corner portion 2C2 and/or the fourth corner portion 2C4 may be thinner than the fourth connecting portion 2L4 in the direction from the front F to the back B of the electronic device 100.

The corner portions 2C1, 2C2, 2C3, and 2C4 may be rounded so as to be smoothly connected to the connecting portions 2L1, 2L2, 2L3, and 2L4.

The corner portions 2C1, 2C2, 2C3, and 2C4 may protrude relative to the connecting portions 2L1, 2L2, 2L3, and 2L4 in the direction perpendicular to that from the front F to the back B of the electronic device 100. For example, when viewed in the section, the corner portions 2C1, 2C2, 2C3, and 2C4 may be thicker than the connecting portions 2L1, 2L2, 2L3, and 2L4 in the direction perpendicular to that from the back B to the front F of the electronic device 100.

The front cover 1 may have a through-hole 1H1 for supporting a speaker or a receiver that is mounted in the electronic device 100. Sound from the speaker or the receiver may be released to the outside through the through-hole 1H1.

The front cover 1 may include one or more transparent areas 1T1 and 1T2 for supporting optical components (e.g., an illumination sensor, an image sensor, a proximity sensor, etc.) that are mounted in the electronic device 100. External light may enter the optical components through the transparent areas 1T1 and 1T2. Further, light from the optical components may be projected to the outside through the transparent areas 1T1 and 1T2.

The front cover 1 may have a through-hole 1H2 for supporting a button that is mounted in the electronic device 100. The button may be exposed to the outside through the through-hole 1H2.

One or more touch keys TK1 and TK2 may be mounted in the electronic device 100. For example, the one or more touch keys TK1 and TK2 may be configured to overlap a second edge area 311-1A2 of the front cover 1.

The back cover 2 may have a through-hole 2H1 for a camera that is mounted in the electronic device 100. The camera may be exposed to the outside through the through-hole 2H1. Further, the back cover 2 may have a through-hole or a transparent area 2H2 for a flash that is mounted in the electronic device 100. Light from the flash may be emitted to the outside through the through-hole or the transparent area 2H2. In addition, the back cover 2 may have a through-hole 2H3 for supporting a speaker that is mounted in the electronic device 100. Sound from the speaker may be released to the outside through the through-hole 2H3.

The bezel 3 may have a through-hole 3H1 for supporting a microphone that is mounted in the electronic device 100. Sound from the outside may enter the microphone through the through-hole 3H1.

The bezel 3 may have a through-hole 3H2 for supporting a connector (e.g., a USB socket, a charging jack, a communication jack, an ear jack, etc.) that is mounted in the electronic device 100. An external device may be connected to the connector of the electronic device 100 through the through-hole 3H2.

The bezel 3 may have one or more through-holes 3H41 and 3H42 for supporting one or more buttons that are mounted in the electronic device 100. The one or more buttons may be exposed to the outside through the through-holes 3H41 and 3H42.

The bezel 3 may have a through-hole 3H5 for supporting an ear jack that is mounted in the electronic device 100. An ear plug may be coupled to the ear jack through the through-hole 3H5.

The bezel 3 may include a plurality of cut-off portions 3P1, 3P2, 3P3, and 3P4. The bezel 3 may include a plurality of segments 3P12, 3P13, 3P24, and 3P34 that are divided by the plurality of cut-off portions 3P1, 3P2, 3P3, and 3P4. In a case where the bezel 3 is formed of metal, the structure formed of the plurality of segments 3P12, 3P13, 3P24, and 3P34 may prevent a degradation in the performance of an antenna that is mounted in the electronic device 100.

At least one of the plurality of segments 3P12, 3P13, 3P24, and 3P34 may be used as an antenna radiator that directly receives a current and radiates electric waves.

At least one of the plurality of segments 3P12, 3P13, 3P24, and 3P34 may also be used as an antenna radiator that indirectly receives a current (for example, electromagnetically receives a current from a power feed unit) and radiates electric waves.

Figure 3:
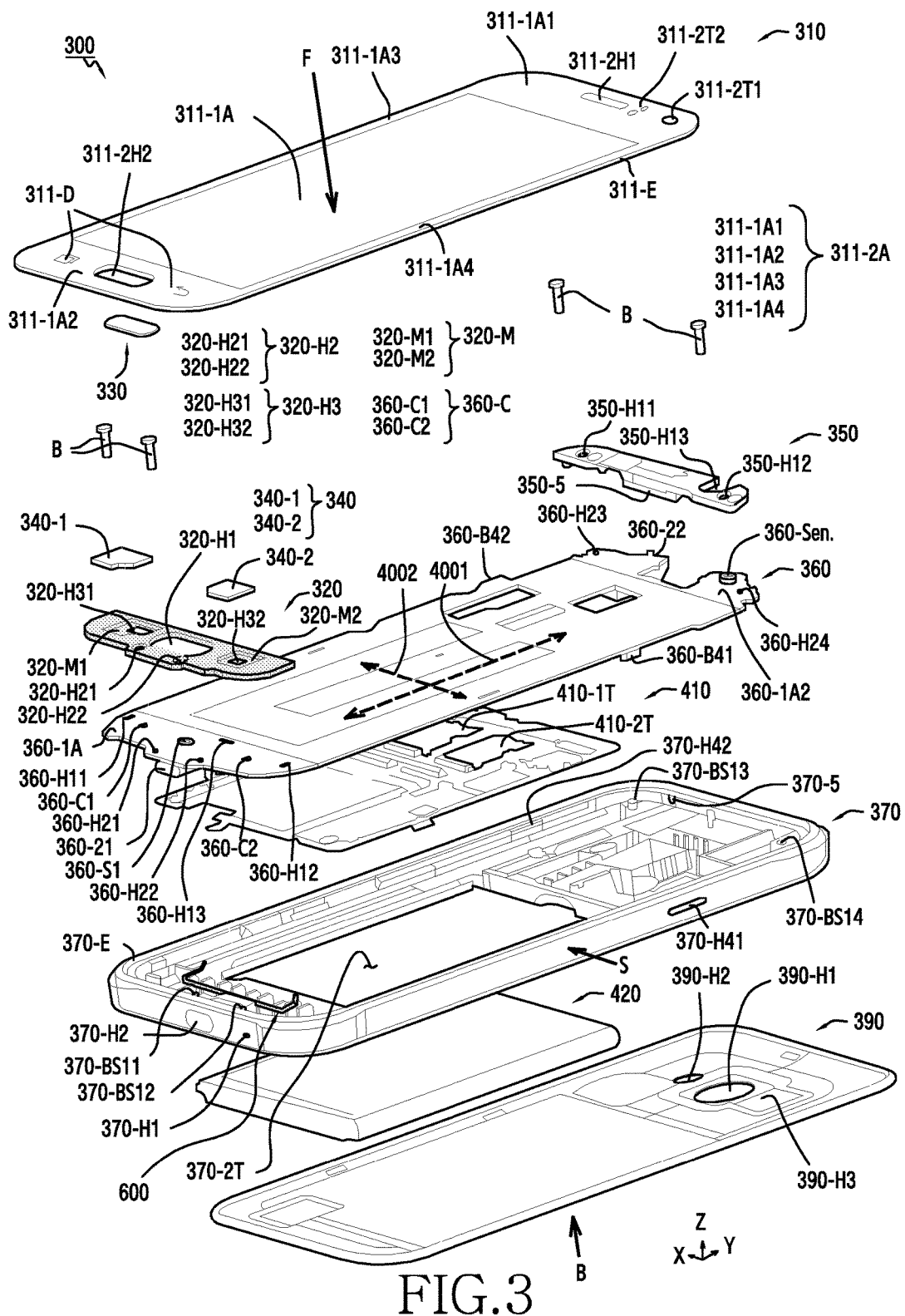
FIG. 3 is a diagram illustrating an electronic device, according to an embodiment of the present disclosure.
Figure 4:
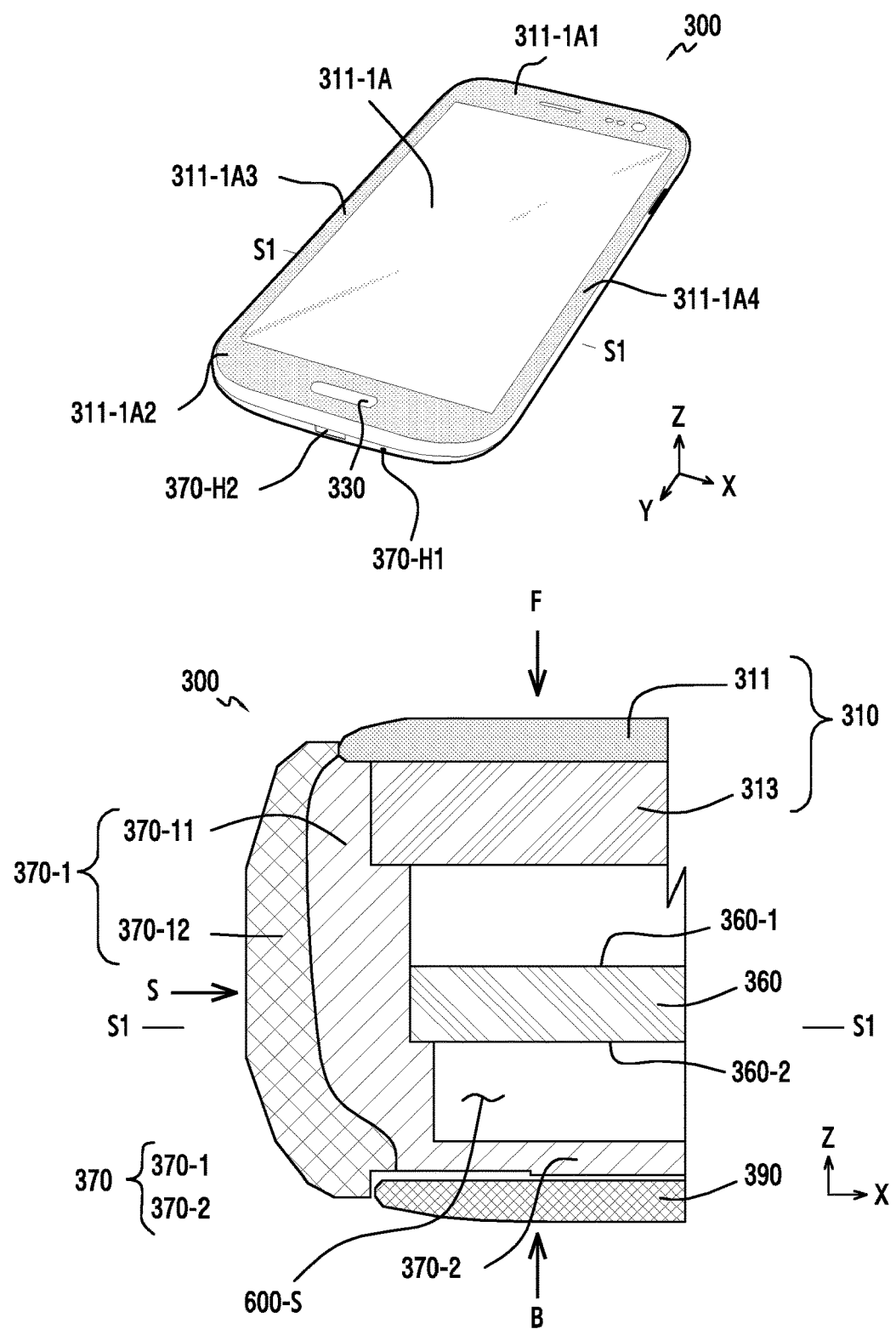
FIG. 4 is a diagram illustrating an electronic device, according to the embodiment of the present disclosure.
Figure 5:
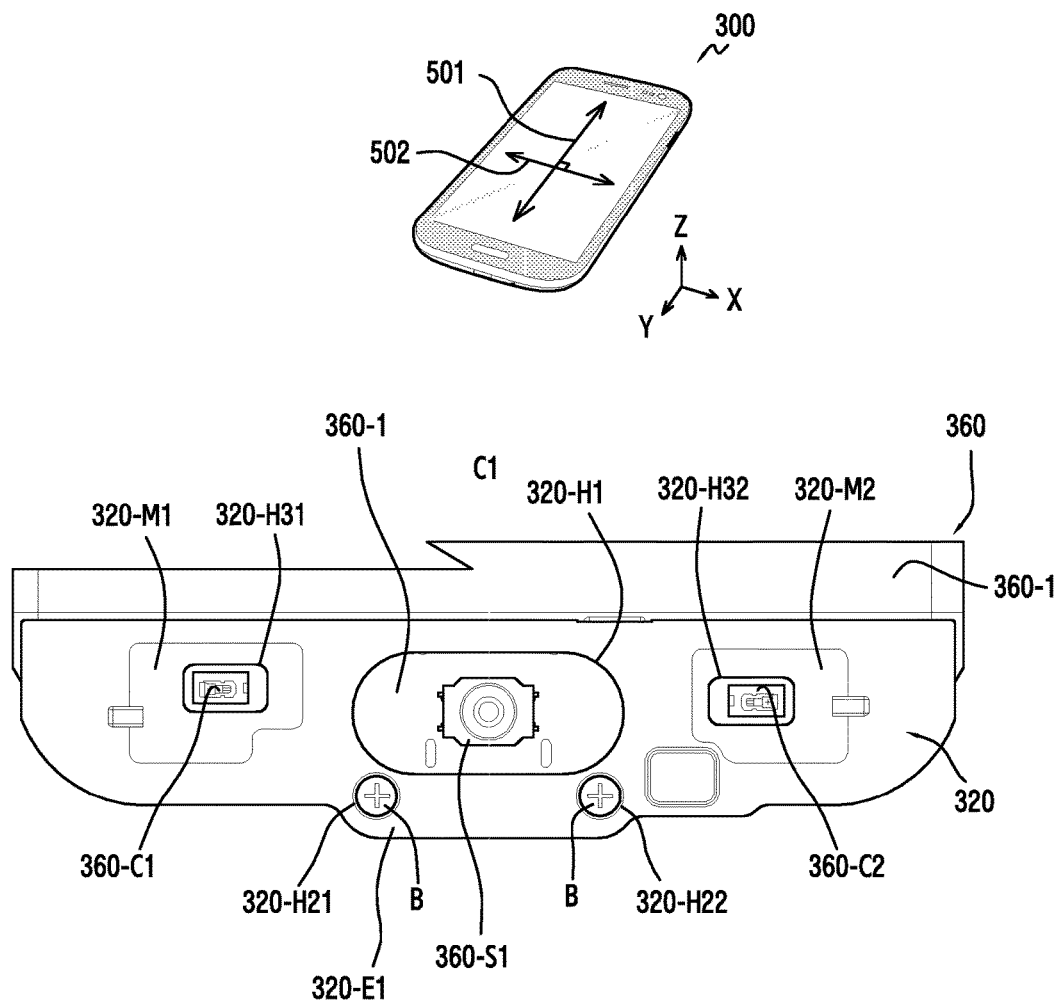
FIG. 5 is a diagram illustrating a coupling state between a spacer and a circuit board, when viewed in the direction from the front to the back of the electronic device, according to an embodiment of the present disclosure.
Figure 6:
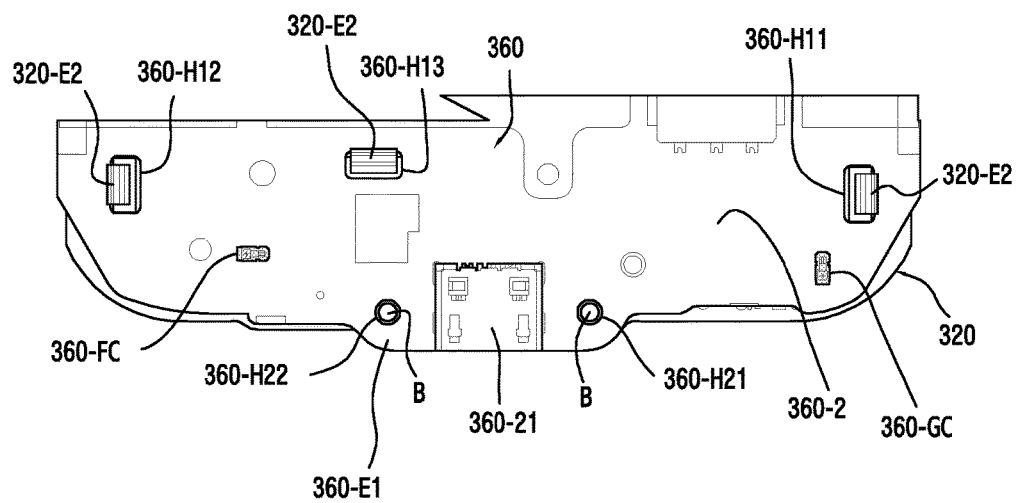
FIG. 6 is a diagram illustrating the coupling state between the spacer and the circuit board, when viewed in the direction from the back to the front of the electronic device, according to the embodiment of the present disclosure.
Figure 7:
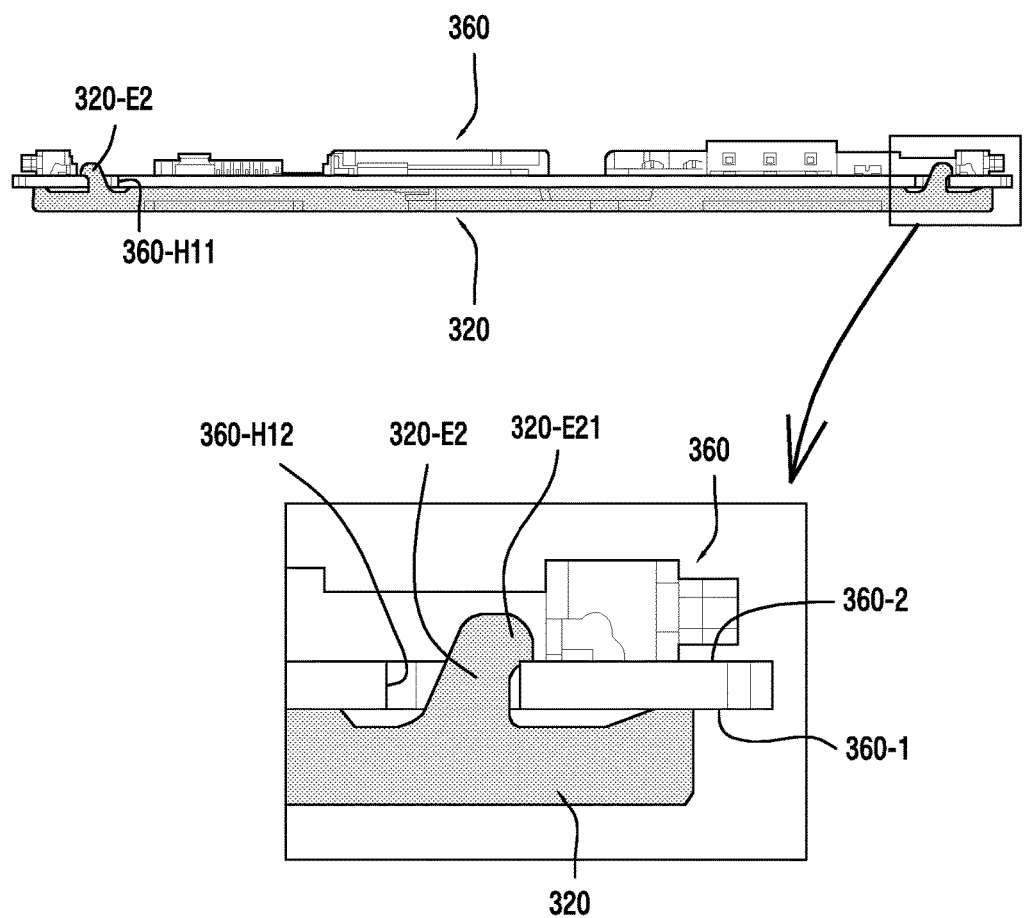
FIG. 7 is a is a diagram illustrating the coupling state between the spacer and the circuit board, according to the embodiment of the present disclosure.

FIG. 3 is a diagram illustrating an electronic device 300, according to an embodiment of the present disclosure. FIG. 4 is a diagram illustrating the electronic device 300, according to the embodiment of the present disclosure. FIG. 5 is a diagram illustrating a coupling state between a spacer 320 and a circuit board 360, according to an embodiment of the present disclosure, when viewed in the direction from the front F to the back B of the electronic device 300. FIG. 6 is a diagram illustrating the coupling state between the spacer 320 and the circuit board 360, according to the embodiment of the present disclosure, when viewed in the direction from the back B to the front F of the electronic device 300. FIG. 7 is a diagram illustrating the coupling state between the spacer 320 and the circuit board 360, according to the embodiment of the present disclosure. The configuration of a part of the electronic device 300 is provided herein, and the configuration may not be applied to the whole electronic device 300.

Referring to FIGS. 3 and 4, the electronic device 300 may include a display device 310, the circuit board 360, the spacer 320, a key plate (button plate) 340, a case frame 370, a cover 390, and an antenna radiator 600.

The display device 310 may include a window 311 and a display 313.

The window 311 may have a substantially plate shape and may contain plastic or glass with impact resistance. The window 311 may be coupled to the case frame 370 to form the front F of the electronic device 300. For example, an annular edge 311-E of the window 311 may be coupled to an annular window installation portion 370-E of the case frame 370 using a coupling means (e.g., a double-sided tape). In a case where the window 311 and the case frame 370 are coupled to each other, a space capable of receiving the display 313 and the circuit board 360 may be provided. Here, the display 313 may be coupled to the window 311.

The window 311 may include a first area 311-1A that is transparent and a second area 311-2A that is opaque. The image display area of the display 313 may be overlaid with the first area 311-1A, and an image on the display 313 may be shown to the outside through the first area 311-1A. For example, the first area 311-1A may have a rectangular shape, and may be the central area 1A of the electronic device 100 of FIG. 1.

The second area 311-2A may be an annular area that surrounds the first area 311-1A and may include a first edge area 311-1A1, a second edge area 311-1A2, a third edge area 311-1A3, and a fourth edge area 311-1A4.

The first edge area 311-1A1 and the second edge area 311-1A2 may be disposed on the opposite longitudinal sides of the rectangular window 311. The third edge area 311-1A3 and the fourth edge area 311-1A4 may be disposed on the opposite lateral sides of the rectangular window 311.

The first edge area 311-1A1 and the second edge area 311-1A2 may have a larger width than the third edge area 311-1A3 and the fourth edge area 311-1A4.

The second area 311-2A may have a plurality of through-holes. For example, the window 311 may have a sound entrance/exit support hole 311-2H1 that is disposed in the second area 311-2A (e.g., the first edge area 311-1A1). Sound from a speaker or receiver mounted in the electronic device 300 may be released to the outside through the sound entrance/exit support hole 311-2H1. For example, the window 311 may have a button support hole 311-2H2 that is disposed in the second area 311-2A (e.g., the first edge area 311-1A1). A button 330 mounted in the electronic device 300 may be inserted into the button support hole 311-2H2 so as to be exposed to the outside.

The window 311 may have one or more sensor support areas 311-2T1 and 311-2T2 that are disposed in the second area 311-2A (e.g., the first edge area 311-1A1). For example, the sensor support areas 311-2T1 and 311-2T2 may be configured to support optical sensors (e.g., an illumination sensor, an image sensor, a proximity sensor, etc.) that are mounted in the electronic device 300.

The display 313 may be disposed between the window 311 and the circuit board 360. The display 313, which is configured to convert an electrical signal provided from the circuit board 360 into an image and to display the image, may include a liquid crystal display (LCD), an organic light-emitting diode (OLED) (particularly, an active matrix (AM) OLED), etc.

The display device 310 may further include a touch panel for a touch input or hovering input. For example, the touch panel may be disposed between the window 311 and the display 313. Alternatively, the display device 310 may also further include a touch panel (e.g., a pen sensor) for supporting an input using an electronic pen or stylus. The display device 310 may support a touch input or hovering input through the first area 311-1A of the window 311.

The display device 310 may provide a display-integrated touch screen. For example, the display device 310 may be an AM-OLED integrated touch screen (e.g., an on-cell TSP AMOLED (OCTA)).

The circuit board 360 (or, the main board, the mother board, the printed board assembly (PBA), etc.) may have a plurality of electronic components mounted thereon and may include an electric circuit that connects the electronic components. The circuit board 360 may set an execution environment of the electronic device 300, maintain the information, and support data input/output exchange between units in the electronic device 300.

The circuit board 360 may include a first side (or surface) 360-1 and a second side (or surface) 360-2 that are configured such that electronic components may be mounted thereon. The first side 360-1 may be configured to be directed toward the front F of the electronic device 300, and the second side 360-2 may be configured to be directed toward the back B of the electronic device 300.

The circuit board 360 may include a push switch 360-S1 mounted on the first side 360-1 of the electronic device 300. The push switch 360-S1 may be vertically located below the button 330. When the button 330 moves vertically downward by a press, the push switch 360-S1 may electrically connect two contact points that are not illustrated in the drawings. For example, the push switch 360-S1 may be a dome switch.

The circuit board 360 may include one or more contacts 360-C that are mounted on the first side 360-1 to support a touch or hovering input. For example, a pair of contacts 360-C1 and 360-C2 may be provided, and the push switch 360-S1 may be disposed between the pair of contacts 360-C1 and 360-C2. The circuit board 360 may include an input circuit or touch input circuit (not illustrated) that is electrically connected to the one or more contacts 360-C. The touch input circuit may determine whether a touch or hovering input is generated or not based on a variation in capacitance. For example, when the variation in capacitance exceeds a threshold value, the touch input circuit may determine that a touch input has been generated. The variation in capacitance may be induced by the proximity of a conductor (e.g., a finger).

The one or more contacts 360-C may be vertically disposed below the second edge area 311-1A2 of the second area 311-2A of the window 311.

The circuit board 360 may include at least one sensor 360-Sen (e.g., an illumination sensor, an image sensor, a proximity sensor, etc.) that is mounted on the first side 360-1 thereof. The at least one sensor 360-Sen may be disposed to use the at least one sensor support area 311-2T1 or 311-2T2 that is formed in the second area 311-2A of the window 311.

The circuit board 360 may include a microphone (not illustrated) that is mounted on the second side 360-2 thereof. The microphone may be located adjacent to a through-hole 370-H1 for supporting a microphone that is formed in the case frame 370.

The circuit board 360 may include one or more push switches that are mounted on the second side 360-2 thereof. For example, one push switch 360-B41 may be used for a function (such as power on/off, screen on/off, etc.), and may be located adjacent to a through-hole 370-H41 for supporting a button that is formed in the case frame 370. For example, another push switch 360-B42 may be used to control the volume of a sound and may be located adjacent to a through-hole 370-H42 for supporting a button that is formed in the case frame 370. Here, the two push switches 360-B41 and 360-B42 may be disposed on the opposite sides of the electronic device 300 in the lateral direction 4002.

The circuit board 360 may include one or more connectors that are mounted on the second side 360-2 thereof. For example, one connector 360-21 may be vertically located below the button 330. Further, the connector 360-21 may be located adjacent to a through-hole 370-H2 for supporting a connector that is formed in the case frame 370. The connector 360-21 may be a USB socket, a charging jack, a communication jack, etc. For example, another connector 360-22 may be an ear jack and may be located adjacent to a through-hole 370-H5 for supporting an ear jack that is formed in the case frame 370. Here, the two connectors 360-21 and 360-22 may be disposed on the opposite sides of the electronic device 300 in the longitudinal direction 4001.

The circuit board 360 may include a plurality of through-holes 360-H21, 360-H22, 360-H23, and 360-H24 for supporting bolt fastening. In particular, a pair of through holes 360-H21 and 360-H22 may be disposed on opposite sides of the connector 360-21, respectively. Another through-hole 360-H23 may be disposed on a corner portion of the circuit board 360 around the ear jack 360-22. Another through-hole 360-H24 may be disposed on a corner portion of the circuit board 360 around the at least one sensor 360-Sen (e.g., an image sensor or a camera sensor). The ear jack 360-22 and the at least one sensor 360-Sen may be disposed between the two through-holes 360-23 and 360-24.

The circuit board 360 may include a spacer installation area 360-1A that is formed on the first side 360-1 thereof. The spacer installation area 360-1A may be vertically disposed below the second edge area 311-1A2 of the second area 311-2A of the window 311.

The push switch 360-S1 and the pair of contacts 360-C1 and 360-C2, which have been described above, may be disposed in the spacer installation area 360-1A.

The spacer installation area 360-1A may include a plurality of through-holes 360-H11, 360-H12, and 360-H13 for supporting the coupling between the spacer 320 and the circuit board 360. For example, although not illustrated, the spacer 320 may include a plurality of hooks that extend in the direction from the front F to the back B of the electronic device 300. The plurality of hooks of the spacer 320 may be inserted into the plurality of through-holes 360-H11, 360-H12, and 360-H13 of the circuit board 360 and may then be coupled to the circuit board 360 by a snap-fit connection.

The spacer installation area 360-1A may include a plurality of through-holes for supporting bolt fastening between the spacer 320, the circuit board 360, and the case frame 370. For example, the spacer installation area 360-1A may include a pair of through-holes 360-H21 and 360-H22 that are disposed on opposite sides of the connector 360-21, respectively.

The spacer 320 may be disposed between the display device 310 and the circuit board 360. In particular, the spacer 320 may be disposed between the window 311 and the spacer installation area 360-1A of the circuit board 360. The spacer 320 may have a substantially plate shape that corresponds to the spacer installation area 360-1A of the circuit board 360.

At least a part of the spacer 320 may be formed of non-metal.

The spacer 320 may include a through-hole 320-H1 vertically disposed below the button 330 in order to support the button 330 and the push switch 360-S1 of the circuit board 360. The button 330 may move vertically downward through the through-hole 320-H1 by a press to press the push switch 360-S1, and the push switch 360-S1 may be electrically connected.

The spacer 320 may include one or more through-holes 320-H3 for supporting a touch or hovering input using the one or more contacts 360-C mounted on the circuit board 360. For example, the spacer 320 may include a pair of through-holes 320-H31 and 320-H32. The through-hole 320-H1 for supporting the button 330 may be disposed between the pair of through-holes 320-H31 and 320-H32 for supporting the pair of contacts 360-C. The pair of contacts 360-C1 and 360-C2 mounted on the circuit board 360 may be inserted into the pair of through-holes 320-H31 and 320-H32 of the spacer 320, respectively.

The spacer 320 may include one or more key plate installation recesses. For example, a pair of key plate installation recesses 320-M1 and 320-M2 may have a shape that is concave in the direction from the front F to the back B of the electronic device 300, and the spaces of the pair of key plate installation recesses 320-M1 and 320-M2 may communicate with the pair of through-holes 320-H31 and 320-H32.

One or more key plates 340 may be coupled to the one or more key plate installation recesses 320-M of the spacer 320. For example, a pair of key plates 340-1 and 340-2 may be coupled to the pair of key plate installation recesses 320-M1 and 320-M2 using a coupling means (e.g., a double-sided tape). The pair of key plates 340 may have shapes that can be press-fit into the pair of key plate installation recesses 320-M.

When the one or more key plates 340 are coupled to the one or more key plate installation recesses 320-M, the one or more key plates 340 may protrude relative to the surface of the spacer 320 that faces the window 311.

At least a part of each key plate 340 may be formed of metal, and the one or more key plates 340 may be electrically connected to the one or more contacts 360-C of the circuit board 360. For example, when the one or more key plates 340 are coupled to the one or more key plate installation recesses 320-M of the spacer 320, the metal portions of the one or more key plates 340 may be located in openings of the one or more through-holes 320-H3 of the spacer 320. Further, the one or more contacts 360-C of the circuit board 360 that are inserted into the one or more through-holes 320-H2 of the spacer 320 may be brought into contact with the metal portions of the one or more key plates 340.

The one or more contacts 360-C of the circuit board 360 have resilience so that the electrical connection between the one or more contacts 360-C and the one or more key plates 340 may be maintained. For example, before the one or more key plates 340 are coupled to the one or more key plate installation recesses 320-M of the spacer 320, and the free ends of the one or more contacts 360-C may intrude into the spaces of the one or more key plate installation recesses 320-M of the spacer 320. When the one or more key plates 340 are installed in the one or more key plate installation recesses 320-M of the spacer 320, the one or more key plates 340 may press the free ends of the one or more contacts 360-C vertically downward while making electrical contact therewith, and the free ends of the one or more contacts 360-C may be pushed toward the spaces of the one or more through-holes 320-H3 of the spacer 320 under the resilient support.

The one or more contacts 360-C mounted on the circuit board 360 may contain a conductive material and may have resilience. For example, the one or more contacts 360-C may be a C-clip, a pogo pin, a spring, a conductive Poron® and rubber, a conductive tape, a cooper connector, etc.

The touch input circuit of the circuit board 360 may feed a current to the one or more key plates 340 through the one or more contacts 360-C. The one or more key plates 340 may form capacitance by the current. Since the window 311 covers the one or more key plates 340, an external conductor (e.g., a finger) is incapable of directly touching the one or more key plates 340, and may closely approach the one or more key plates 340 through the window 311. As the external conductor closely approaches the one or more key plates 340, the capacitance varies, and the touch input circuit may detect the variation in the capacitance and may determine that a touch input has been generated. Here, signs for areas 311-D where a touch or hovering input using the one or more contacts 360-C is possible may be provided in the second edge area 311-1A2 of the second area 311-2A of the window 311. These areas 311-D may be close to the key plates 340.

The spacer 320 may have a plurality of bolt fastening holes for supporting bolt fastening. For example, the spacer 320 may have a pair of bolt fastening holes 320-H21 and 320-H22 that are vertically disposed above the pair of through-holes 360-H21 and 360-H22 of the circuit board 360.

The gap between the key plates 340 and the circuit board 360 may be maintained by virtue of the spacer 320, which makes it possible to maintain the contact points between the key plates 340 and the contacts 360-C.

The electronic device 300 may further include another spacer 350. The spacer 350 may be disposed between the window 311 and the circuit board 360. The spacer 350 may have a substantially plate shape that corresponds to a spacer installation area 360-1A2 of the circuit board 360. The spacer 350 may be vertically disposed below the first edge area 311-1A1 of the window 311, and the spacers 320 and 350 may be located opposite to each other.

The spacer 350 may have a plurality of bolt fastening holes for supporting bolt fastening. For example, the spacer 350 may have a plurality of bolt fastening holes 350-H11 and 350-H12 that are vertically disposed above the plurality of through-holes 360-H23 and 360-H24 of the circuit board 360.

The other spacer 350 may include an opening 350-H13 disposed between the at least one sensor 360-Sen mounted on the circuit board 360 and the at least one sensor support area 311-2T1 or 311-2T2 of the window 311. The at least one sensor 360-Sen may use the at least one sensor support area 311-2T1 or 311-2T2 of the window 311 through the opening 350-H13 of the spacer 350.

The other spacer 350 may further include a receiver device 350-5. When the other spacer 350 is coupled to the circuit board 360, non-illustrated contacts of the receiver device 350-5 may be electrically connected to the circuit board 360.

The gap between the display device 310 and the circuit board 360 may be maintained by virtue of the spacers 320 and 350. For example, the gap between the window 311 and the circuit board 360 may be maintained.

The case frame 370 may have a substantially container shape that is open in the direction from the back B to the front F of the electronic device 300, and may form the whole frame of the electronic device 300. Electronic components (e.g., the display device 310, the circuit board 360, etc.) may be installed in the frame structure formed of the case frame 370.

The case frame 370 may include a first part 370-1 that forms the lateral side S (FIG. 3) of the electronic device 300 and a second part 370-2 that extends from the first part 370-1 and is disposed between the circuit board 360 and the cover 390.

The first part 370-1 of the case frame 370 may have the through-hole 3H1 for supporting a microphone that is mounted in the electronic device 300.

The first part 370-1 of the case frame 370 may have the through-hole 3H2 for supporting a connector (e.g., a USB socket, a charging jack, a communication jack, an ear jack, etc.) that is mounted in the electronic device 300.

The first part 370-1 of the case frame 370 may have the one or more through-holes 370-H41 and 370-H42 for supporting one or more buttons that are mounted in the electronic device 300.

The first part 370-1 of the case frame 370 may have the through-hole 370-H5 (e.g., the through-hole 3H5 in FIG. 2) for supporting an ear jack that is mounted in the electronic device 300.

The first part 370-1 of the case frame 370 may include an inner part 370-11 and an outer part 370-12 that are superposed on each other in the direction perpendicular to that from the back B to the front F of the electronic device 300. The outer part 370-12 may have an annular shape and may include, for example, the bezel 3 of the electronic device 100 of FIG. 1.

The second part 370-2 of the case frame 370 may have a shape that can be coupled to the circuit board 360, and the circuit board 360 may be mounted on the case frame 370 with no clearance therebetween. For example, the second part 370-2 of the case frame 370 may have a plurality of ribs that extend toward the second side 360-2 of the circuit board 360, and the ribs may be configured to support the circuit board 360.

The second part 370-2 of the case frame 370 may include a plurality of bosses for supporting bolt fastening. For example, the second part 370-2 of the case frame 370 may include a plurality of bosses 370-BS11, 370-BS12, 370-B13, and 370-B14 that are vertically disposed below the plurality of through-holes 360-H21, 360-H22, 360-H23, and 360-H24 of the circuit board 360.

The spacers 320 and 350, the circuit board 360, and the case frame 370 may be coupled to each other using a plurality of bolts B (FIG. 3). The bolts B may be fastened in the direction from the front F to the back B of the electronic device 300.

The second part 370-2 of the case frame 370 may include a battery pack receiving part 370-2T that provides a space for receiving a battery pack 420.

The electronic device 300 may further include a shield can 410 that is coupled to the second side 360-2 of the circuit board 360. The shield can 410 may serve to shield noise that is generated in the electronic device 300. The battery pack receiving part 370-2T (FIG. 3) may be formed through the case frame 370-2 in the direction from the back B to the front F of the electronic device 300, and the shield can 410 may be configured to block one side of the battery pack receiving part 370-2T so that the shape of a container may be formed, which is open in the direction from the front F to the back B of the electronic device 300.

The shield can 410 may include one or more openings 410-1T and 410-2T for supporting one or more memory sockets (not illustrated) that are mounted on the second side 360-2 of the circuit board 360. The one or more memory sockets may be exposed through the one or more openings 410-1T and 410-2T of the shield can 410. For example, when the battery pack 420 is separated while the cover 390 is detached, the one or more memory sockets are exposed so that it is possible to attach/detach memory.

The case frame 370 may contain a conductive material and may be electrically connected to the ground surface of the circuit board 360. For example, a conductive material may be applied to one side of the second part 370-2 of the case frame 370. The electrical connection between the conductive material of the case frame 370 and the ground surface of the circuit board 360 may be induced by bringing the ribs of the second part 370-2 into contact with the ground surface of the circuit board 360. Here, the ribs of the second part 370-2 may include a conductive rubber gasket that is brought into resilient contact with the ground surface of the circuit board 360.

The cover 390 may be coupled to the second part 370-2 of the case frame 370 and may form the back B of the electronic device 300. The cover 390 may be curvilinear, and the back B of the electronic device 300 may be formed as a curved surface. The second part 370-2 of the case frame 370 may have the shape of a recess in which the cover 390 may be positioned, and therefore the cover 390 may be mounted on the case frame 370 with no clearance therebetween in such a manner that the cover 390 is press-fit into the second part 370-2 of the case frame 370. The cover 390 may be coupled to the second part 370-2 of the case frame 370 by a snap-fit connection. The cover 390 may be separated from the case frame 370 in order to attach/detach electronic components (e.g., a memory card, the battery pack 420, etc.).

The cover 390 may have a through-hole 390-H1 for supporting a camera that is mounted on the second side 360-2 of the circuit board 360. The camera may be exposed to the outside through the through-hole 390-H1.

The cover 390 may have a transparent section (or an opening) 390-H2 for supporting a flash that is mounted on the second side 360-2 of the circuit board 360. Light from the flash may be emitted to the outside through the transparent section.

The cover 390 may have a through-hole 390-H3 for supporting a speaker that is mounted on the second side 360-2 of the circuit board 360. Sound from the speaker may be released to the outside through the through-hole 390-H3.

The window 311, the case frame 370, and the cover 390, which form the exterior of the electronic device 300, may be collectively referred to as a 'housing.'

The electronic device 300 may further include a bracket or a mounting plate that is disposed between the display device 310 and the circuit board 360. The bracket may have a plate shape or other suitable shape. The display device 310 may be coupled to one side of the bracket that is directed toward the front F of the electronic device 300, and the circuit board 360 may be coupled to the other side of the bracket that is directed toward the back B of the electronic device 300.

The bracket may impart rigidity to the display device 310 and the circuit board 360. Further, the bracket may be used to shield electromagnetic waves or electrical noise, or may be used as a heat dissipation plate that prevents electronic components from being unnecessarily heated. The bracket may be formed of metal (such as magnesium, aluminum, etc.) or may be formed of non-metal (such as plastic, etc.) without being limited thereto. Additionally, a material for shielding electromagnetic waves may be applied to the bracket.

The bracket may be included in the display device 310.

The electronic device 300 may not include a bracket. For example, the display device 310 may provide rigidity that may sufficiently replace a bracket.

The antenna radiator 600 may be at least partially disposed inside the housing and/or in a part of the housing and may be electrically connected to the circuit board 360. For example, the antenna radiator 600 may be disposed between the circuit board 360 and the second part 370-2 of the case frame 370. For example, the antenna radiator 600 (FIG. 9) may be coupled to the second part 370-2 of the case frame 370.

The antenna radiator 600 may be vertically located below the second edge area 311-1A2 of the second area 311-2A of the window 311. Further, the antenna radiator 600 may be disposed around the one or more key plates 340.

The antenna radiator 600 may be a conductive pattern that extends in the lateral direction 4002 of the electronic device 300.

Referring to FIGS. 5 to 7, the spacer 320 may be symmetric with respect to the center line C1 of the electronic device 300, which has a substantially rectangular shape, in the longitudinal direction 501.

The spacer 320 may support the first through-hole 320-H1 for supporting the push switch 360-S1 that is mounted on the first side 360-1 of the circuit board 360. When the spacer 320 is coupled to the circuit board 360, the push switch 360-S1 of the circuit board 360 may be exposed through the first through-hole 320-H1 of the spacer 320. For example, the first through-hole 320-H1 may extend in the lateral direction 502 of the rectangular electronic device 300 and may include opposite round sections.

The spacer 320 may have the pair of second through-holes 320-H21 and 320-H22 for supporting bolt fastening with the circuit board 360. The pair of second through-holes 320-H21 and 320-H22 may be arranged in the lateral direction 502 of the rectangular electronic device 300. The circuit board 360 may have the pair of through-holes 360-H21 and 360-H22 for supporting bolt fastening with the spacer 320. One pair of bolts B may be fastened to the pair of second through-holes 320-H21 and 320-H22 of the spacer 320 and the pair of through-holes 360-H21 and 360-H22 of the circuit board 360 so that the spacer 320 and the circuit board 360 may be coupled to each other.

The spacer 320 may include an extension area 320-E1 that protrudes in the longitudinal direction 501 of the rectangular electronic device 300, and the pair of second through-holes 320-H21 and 320-H22 may be arranged in the extension area 320-E1. Likewise, the circuit board 360 may include an extension area 360-E1 that protrudes in the longitudinal direction 501 of the rectangular electronic device 300, and the pair of through-holes 360-H21 and 360-H22 may be arranged in the extension area 360-E1.

The connector 360-21 mounted on the second side 360-2 of the circuit board 360 may be disposed between the pair of through-holes 360-H21 and 360-H22 that support the bolt fastening.

The spacer 320 may have the pair of third through-holes 320-H31 and 320-H32 for supporting the pair of contacts 360-C1 and 360-C2 that are mounted on the second side 360-2 of the circuit board 360. When the spacer 320 is coupled to the circuit board 360, the pair of contacts 360-C1 and 360-C2 of the circuit board 360 may be exposed through the pair of third through-hole 320-H31 and 320-H32 of the spacer 320.

The pair of third through-holes 320-H31 and 320-H32 of the spacer 320 may be arranged in the lateral direction 502 of the rectangular electronic device 300.

The first through-hole 320-H1 of the spacer 320 may be arranged between the pair of third through-holes 320-H31 and 320-H32.

The spacer 320 may include the pair of key plate installation recesses 320-M1 and 320-M2 (FIG. 3) for supporting the pair of key plates 340-1 and 340-2 of FIG. 3A. The pair of key plate installation recesses 320-M1 and 320-M2 may have a shape that is concave in the direction from the front F to the back B of the electronic device 300, and the spaces of the pair of key plate installation recesses 320-M1 and 320-M2 may communicate with the pair of third through-holes 320-H31 and 320-H32, respectively.

The spacer 320 may include a plurality of extensions 320-E2 for supporting snap-fit coupling with the circuit board 360. The plurality of extensions 320-E may extend in the direction from the front F to the back B of the electronic device 300. The plurality of extensions 320-E2 may include free ends 320-E21 (FIG. 7) in the shape of a hook. The circuit board 360 may have the plurality of through-holes 360-H11, 360-H12, and 360-H13 for supporting snap-fit coupling with the spacer 320. For example, the plurality of extensions 320-E2 of the spacer 320, while being inserted into the plurality of through-holes 360-H11, 360-H12, and 360-H13 of the circuit board 360, may bend due to friction between the hook-shaped free ends 320-E21 and the plurality of through-holes 360-H11, 360-H12, and 360-H13. When the free ends 320-E21 of the plurality of extensions 320-E2 of the spacer 320 completely passes through the plurality of through-holes 360-H11, 360-H12, and 360-H13 of the circuit board 360, the plurality of extensions 320-E2 of the spacer 320 may return to the original state, and the plurality of extensions 320-E2 of the spacer 320 may be fastened to the plurality of through-holes 360-H11, 360-H12, and 360-H13 of the circuit board 360. Accordingly, the spacer 320 and the circuit board 360 may be coupled to each other.

The circuit board 360 may include a first antenna contact 360-FC (FIG. 9) and a second antenna contact 360-GC (FIG. 9) that are mounted on the second side 360-2 thereof. For example, when the circuit board 360 and the case frame 370 are coupled to each other, a first end portion and a second end portion of the antenna radiator 600 may be electrically connected to the first antenna contact 360-FC and the second antenna contact 360-GC of the circuit board 360. The circuit board 360 may supply a current to the antenna radiator 600 through the first antenna contact 360-FC. The current supplied from the circuit board 360 to the antenna radiator 600 may circulate along the conductive pattern of the antenna radiator 600 and may flow into the ground (particularly, the ground for an antenna device) of the circuit board 360 through the second antenna contact 360-GC of the circuit board 360 so that a transmission line capable of transmitting/receiving radio electromagnetic waves may be formed.

Figure 8:
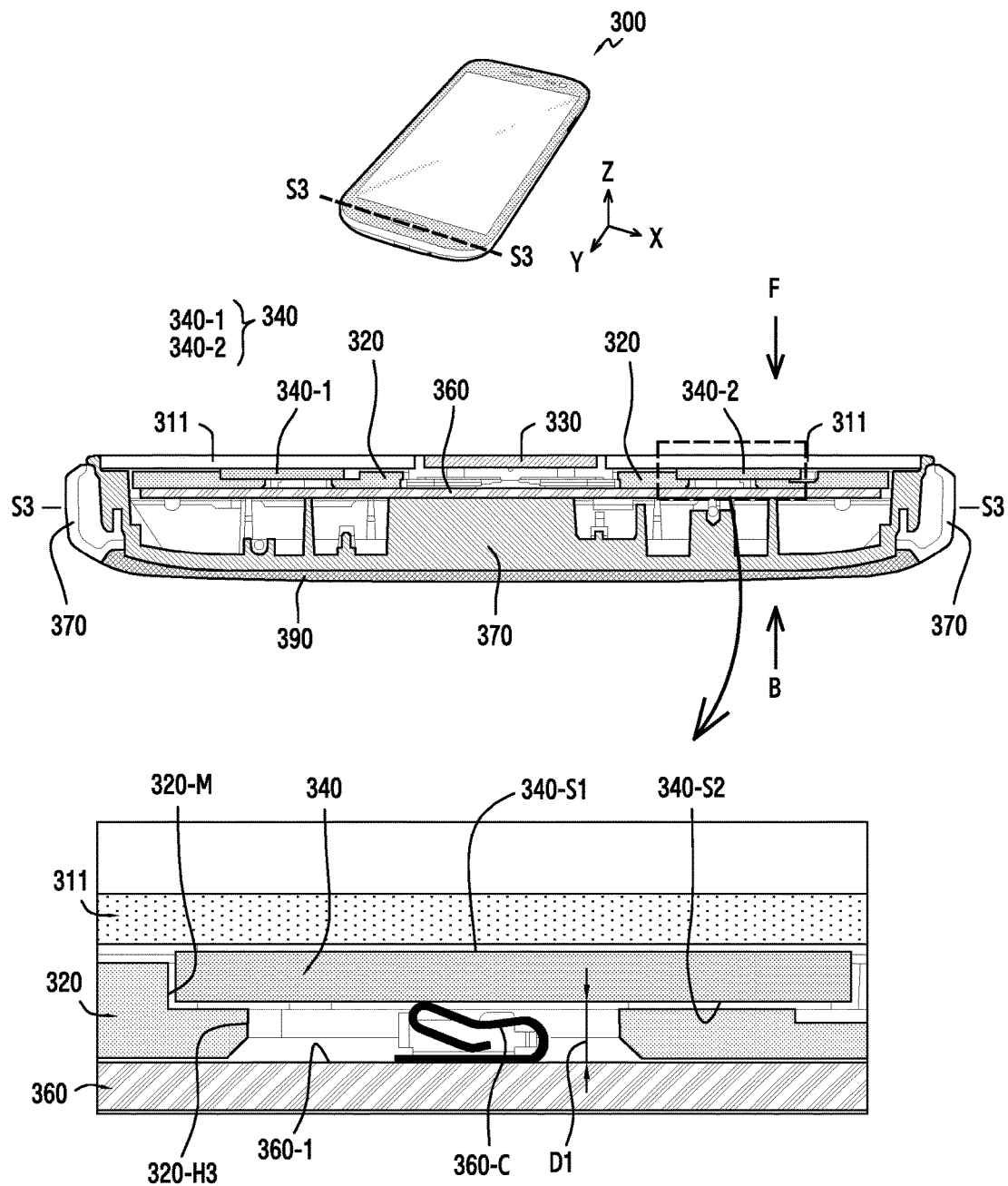
FIG. 8 is a diagram illustrating a coupling state between a display device, the spacer, a key plate, the circuit board, a case frame, and a cover, according to an embodiment of the present disclosure.

FIG. 8 is a diagram illustrating a coupling state between the display device 310 (particularly, the window 311), the spacer 320, the key plate 340, the circuit board 360, the case frame 370, and the cover 390, according to an embodiment of the present disclosure.

Referring to FIG. 8, the spacer 320 may be coupled to the circuit board 360 and may be disposed on the first side 360-1 of the circuit board 360. The key plate 340 may be coupled to the key plate installation recess 320-M of the spacer 320. The window 311 may be coupled to the case frame 370. The key plate 340 and the spacer 320 may be disposed between the window 311 and the circuit board 360.

The key plate 340 may include a first side (or surface) 340-S1 directed toward the front F of the electronic device 300 and a second side (or surface) 340-S2 directed toward the back B of the electronic device 300. The second side 340-S2 of the key plate 340 may be coupled to the annular surface of the key plate installation recess 320-M using a coupling means (e.g., a double-sided tape, an adhesive, etc.). Additionally, the first side 340-S1 of the key plate 340 may be coupled to the window 311 using a coupling means (e.g., a double-sided tape, an adhesive, etc.).

The contacts 360-C (e.g., C-clip) mounted on the first side 360-1 of the circuit board 360 may be brought into contact with a metal surface of at least a part of the second side 340-S2 of the key plate 340 through the through-hole 320-H3 of the spacer 320. The contact 360-C has resilience so that the electrical connection between the contact 360-C and the key plate 340 may be maintained. The gap D1 between the key plate 340 and the circuit board 360 may correspond to a distance by which the contact 360-C resiliently deforms to resiliently press the key plate 340.

The gap D1 between the key plates 340 and the circuit board 360 may be maintained by virtue of the spacer 320, which makes it possible to maintain the electrical contact points between the key plates 340 and the contact 360-C. For example, even though an external impact is applied to the position on the window 311 that corresponds to the contact 360-C, the electrical contact points between the key plate 340 and the contact 360-C may be maintained.

Figure 9:
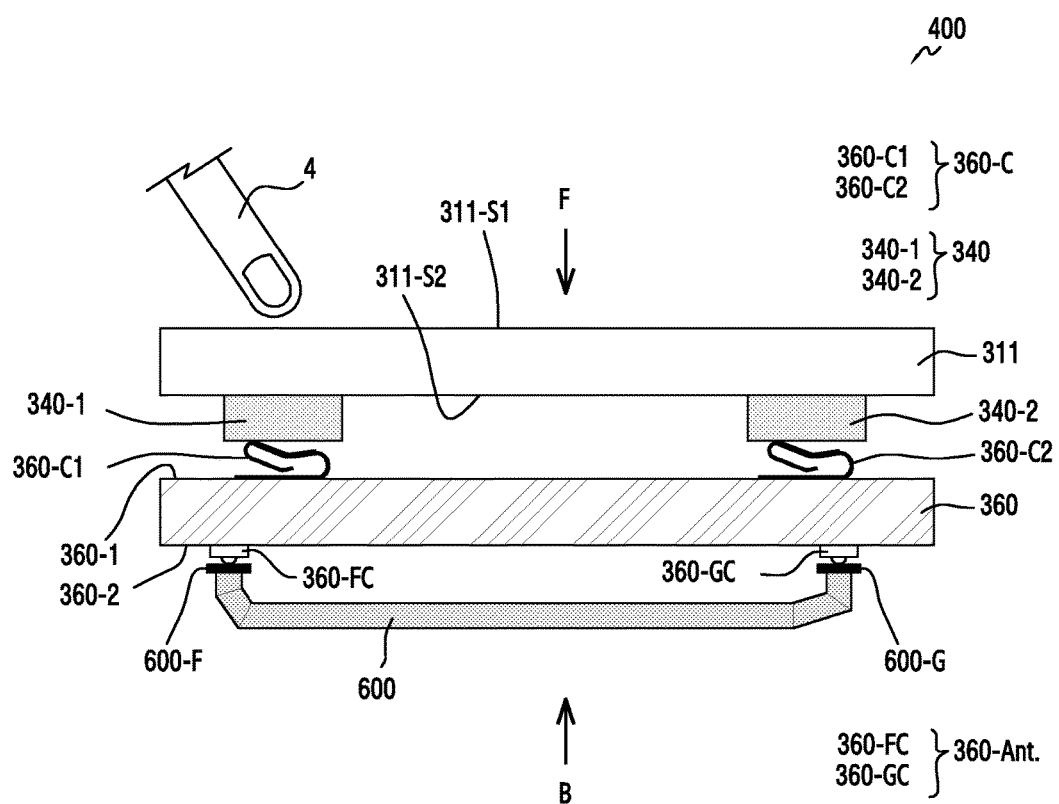
FIG. 9 is a diagram illustrating an electronic device, according to an embodiment of the present disclosure.
Figure 10:
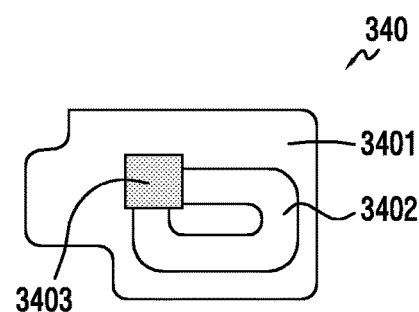
FIG. 10 is a diagram illustrating a key plate, according to an embodiment of the present disclosure.

FIG. 9 is a diagram illustrating an electronic device, according to an embodiment of the present disclosure. FIG. 10 is a diagram illustrating a key plate, according to an embodiment of the present disclosure.

Referring to FIGS. 9 and 10, an input device 400 may include a window 311, one or more key plates 340-C, a circuit board 360, one or more key contacts 360-C, and one or more antenna contacts 360-Ant.

The window 311 may form the front F of the electronic device 300 of FIG. 3. The window 311 may have a plate shape with a thickness and may have a uniform thickness on the whole, or may partially have a non-uniform thickness.

The window 311 may include a first side (or surface) 311-S1 directed toward the front F of the electronic device 300 and a second side (or surface) 311-S2 directed toward the back B of the electronic device 300.

The one or more key plates 340-C may be disposed between the window 311 and the circuit board 360. In particular, the one or more key plates 340-C may be disposed close to the second side 311-S2 of the window 311.

The one or more key plates 340-C may contain a conductive material that may receive a current from the circuit board 360 to generate capacitance. In addition, the one or more key plates 340-C may detect a variation in the capacitance and may convert the capacitance variation into an electrical signal. A variation in capacitance may be induced by an object (e.g., a finger 4) close to the first side (or surface) 311-1 of the window 311. The one or more key plates 340-C may be constituted by a conductive tape, a cooper, ITO, etc. The key plates 340-C may be referred to as an 'input sensor' or 'touch sensor.'

Each of the one or more key plates 340-C may include a plate section 3401, a conductive layer 3402, and a contact section 3403 (FIG. 10).

The plate section 3401 of the key plate 340-C may be formed of a non-conductive material and may have a substantially thin film shape. Further, the plate section 3401 of the key plate 340-C may be flexible.

The conductive layer 3402 of the key plate 340-C may be disposed on the plate section 3401. In particular, the conductive layer 3402 may be configured to be inserted into the plate section 3401. The conductive layer 3402 may be an annular conductive pattern.

The contact section 3403 of the key plate 340-C may be electrically connected to the contact 360-C mounted on the circuit board 360. The contact section 3403 may be electrically connected to the conductive layer 3402.

The conductive layer 3402 of the key plate 340-C may receive a current from the circuit board 360 through the contact section 3403 to generate capacitance. Further, the key plate 340-C may transfer a signal relating to a variation in the capacitance to the circuit board 360 through the contact section 3403.

The one or more key plates 340-C may be constituted by a flexible printed circuit board (FPCB).

The one or more key plates 340-C may be coupled to the second side 311-S2 of the window 311, or may be constituted as a part of the second side 311-S2. For example, the one or more key plates 340-C may be layers that are coupled to the second side 311-S2 of the window 311. For example, the one or more key plates 340-C may be formed on the second side 311-S2 of the window 311 through a method, such as printing, coating, etc.

The one or more key plates 340-C may be mounted on the first side 360-1 of the circuit board 360 using the surface mounting technology (SMT).

The circuit board 360 may be stacked on the window 311 in the direction from the front F to the back B of the electronic device 300. The circuit board 360 may include a touch input circuit that receives a signal relating to a variation in capacitance from the one or more key plates 340-C and recognizes the occurrence of a user input from the signal.

The one or more contacts 360-C may be mounted on the first side 360-1 of the circuit board 360 and may be electrically connected to the above-described touch input circuit. The one or more contacts 360-C may be disposed between the one or more key plates 340-C and the circuit board 360. The one or more contacts 360-C may be electrically connected to the key plates 340-C. Namely, the one or more contacts 360-C may electrically connect the one or more key plates 340-C and the circuit board 360.

When a dielectric body (e.g., a finger) closely approaches the first side 311-S1 of the window 311, the capacitance of the key plates 340-C may vary, and the key plates 340-C may transfer a signal relating to the variation in the capacitance to the circuit board 360 through the contacts 360-C.

Since the one or more contacts 360-C have resilience, the contacts may improve the feeling of manipulating keys. For example, when a finger presses the first side 311-S1 of the window 311 in the direction from the front F to the back B of the electronic device 300, the portion of the window 311 that the finger contacts may deflect downward under the resilient support of the contacts 360-C, thereby providing an effect similar to the press of a button.

An antenna radiator 600 may include a first end portion 600-F and a second end portion 600-G. The first end portion 600-F may be electrically connected to a first antenna contact 360-FC of the circuit board 360, and the second end portion 600-G may be electrically connected to a second antenna contact 360-G of the circuit board 360.

The key plates 340-C may be directly connected to the contacts 360-C of the circuit board 360, instead of being electrically connected to the circuit board 360 using separate electrical connecting means (e.g., an FPCB, a cable, etc.). Since electrical connecting lines are not formed between the key plates 340-C and the circuit board 360, it is possible to reduce a degradation in the antenna performance of the antenna device that uses the antenna radiator 600. Further, even though the plurality of key plates 340-C are provided, since electrical connecting lines are not formed between the plurality of key plates 340-C, it is possible to reduce a degradation in the antenna performance of the antenna device that uses the antenna radiator 600.

The electronic device 300 may further include a matching circuit or an antenna matching circuit in order to reduce the degradation in the antenna performance of the antenna device. The matching circuit may be mounted on the circuit board 360 and may be electrically connected to the above-described touch input circuit that uses the one or more key plates 340-C, or may be a part of the touch input circuit. The matching circuit will be described below with reference to FIGS. 11 to 14.

Figure 11:
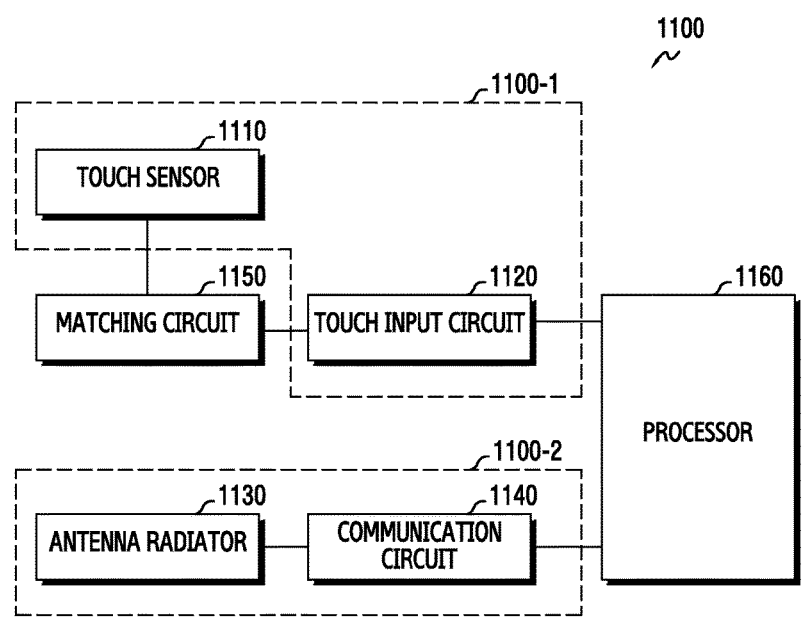
FIG. 11 is a diagram illustrating an electronic device, according to an embodiment of the present disclosure.

FIG. 11 is a diagram of an electronic device 1100, according to an embodiment of the present disclosure. The electronic device 1100 may be the electronic device 300 and may include all or some of the components of FIG. 3.

Referring to FIG. 11, the electronic device 1100 may include a touch input device 1100-1, an antenna device 1100-2, a matching circuit 1150, and a processor 1160.

The touch input device 1100-1 may include at least one touch sensor 1110 and a touch input circuit 1120. The at least one touch sensor 1110 may be electrically connected to the touch input circuit 1120 and may receive a current from the touch input circuit 1120. In particular, the touch sensor 1110 may be connected to the touch input circuit 1120 through an electrical connection to at least one contact 360-C that is mounted on a circuit board (e.g., 360 of FIG. 10) in which the touch input circuit 1120 is installed.

The touch sensor 1110 may contain a conductive material that may generate capacitance by a current. The touch sensor 1110 may generate a signal relating to a variation in capacitance.

The at least one touch sensor 1110 may be the above-described key plate 340-C and may be disposed close to a window 311. When a dielectric body, such as a finger, etc., closely approaches a suitable place of the window 311 to which the touch sensor 1110 is close, capacitance may vary. The at least one touch sensor 1110 may be the at least one touch sensor 340 of FIG. 10.

The touch input circuit 1120 may be electrically connected to the at least one touch sensor 1110 and the processor 1160. The touch input circuit 1120 may be configured to receive a signal relating to a variation in capacitance from the touch sensor 1110 and to identify the presence or absence of a touch input based on the signal. For example, when the variation in capacitance exceeds a threshold value, the touch input circuit 1120 may determine that a touch input has been generated. The touch input circuit 1120 may transfer the touch input to the processor 1160.

The antenna device 1100-2 may include at least one antenna radiator 1130 and a communication circuit 1140. The at least one antenna radiator 1130 may support various forms of communication. The at least one antenna radiator 1130 may support cellular communication and/or short range communication. The cellular communication may include, for example, at least one of long term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), etc. The short range communication may include, for example, at least one of WiFi, Bluetooth, near field communication (NFC), global navigation Satellite system (GNSS), etc. The at least one antenna radiator 1130 may include the antenna radiator 600 of FIG. 10.

A plurality of antenna radiators 1130 may be provided, some of which may be configured to resonate in the same communication frequency band, or in different communication frequency bands.

The at least one antenna radiator 1130 may be disposed in various positions of the electronic device 1100. For example, the at least one antenna radiator 1130 may be at least partially disposed inside the housing (e.g., the case frame 370 of FIG. 3) that forms the exterior of the electronic device 1100, and/or in a part of the housing.

The at least one antenna radiator 1130 may be mounted on the circuit board (e.g., the circuit board 360 of FIG. 3) on which the touch input circuit 1120, the communication circuit 1140, and the matching circuit 1150 are mounted.

The at least one antenna radiator 1130 may be configured in at least one type of a monopole antenna, a dipole antenna, an inverted-f antenna (IFA), a planar inverted-f antenna (PIFA), a loop antenna, and a slot antenna.

The communication circuit 1140 may be electrically connected to the at least one antenna radiator 1130 and the processor 1160. The communication circuit 1140 may support various forms of communication that use the at least one antenna radiator 1130. The communication circuit 1140 may transmit and receive radio frequency signals through the at least one antenna radiator 1130. The communication circuit 1140 may be mounted on the circuit board (e.g., the circuit board 360 of FIG. 10) on which the processor 1160 is mounted, and may include all RF components between the at least one antenna radiator 1130 and the processor 1160. For example, the communication circuit 1140 may include a radio frequency integrated circuit (RFIC) and a front end module (FEM). The RFIC (e.g., an RF transceiver) may receive electric waves from a base station and may modulate the received high-frequency waves into a low-frequency band (baseband) that can be processed in the processor 1160. The RFIC may modulate low-frequency waves processed in the processor 1160 into high-frequency waves in order to transmit the same to the base station. The FEM may be a transceiver that can control an electric wave signal. The FEM may connect the at least one antenna radiator 1130 and the RFIC and may separate transmitted/received signals. The FEM may perform filtering and amplification, and may include a receiving-end front end module having an internal filter for filtering a received signal and a transmitting-end front end module having an internal power amplifier module (PAM) for amplifying a signal to be transmitted.

In the reception of a radio signal, the communication circuit 1140 may receive a radio signal from the at least one antenna radiator 1130, convert the received radio signal into a baseband signal, and transmit the converted baseband signal to the processor 1160. The processor 1160 may process the received baseband signal and may control human/mechanical interfaces of the electronic device 1100 that correspond to the received baseband signal.

In the transmission of a radio signal, the processor 1160 may generate a baseband signal and may output the generated baseband signal to the communication circuit 1140. The communication circuit 1140 may receive the baseband signal from the processor 1160, convert the received baseband signal into a radio signal, and transmit the converted radio signal into the air through the at least one antenna radiator 1130.

The communication circuit 1140 may support at least one communication scheme of single input multiple output (SIMO), multiple input single output (MISO), diversity, and multiple input multiple output (MIMO) by using the at least one antenna radiator 1130.

The processor 1160 may receive a touch input from the touch input circuit 1120 and may process an output routine relating to the same. For example, the processor 1160 may provide a menu for selecting various functions or applications in response to a touch input that corresponds to the first touch key TK1 of FIG. 1. The processor 1160 may switch a screen into the home screen, or may end a running application, in response to a touch input that corresponds to the second touch key TK2 of FIG. 1.

The matching circuit 1150 may be electrically connected to the touch sensor 1110 and the touch input circuit 1120. The touch sensor 1110 may be electrically connected to the touch input circuit 1120 through the matching circuit 1150.

The matching circuit 1150 may improve the isolation between the touch input device 1110-1 and the antenna device 1100-2. The interference between the touch input device 1100-1 and the antenna device 1100-2 may be reduced, and the antenna performance of the antenna device 1100-2 may be maintained. For example, the antenna performance of the at least one antenna radiator 1130 may not be degraded by the touch sensor 1110 and/or the one or more contacts 360-C around the antenna radiator 1130.

The matching circuit 1150 may be configured such that at least a part of the touch input device 1110-1 supports the operation of the antenna device 1100-2. For example, the touch sensor 1110 may serve as an antenna radiator for supporting the antenna device 1100-2 by the matching circuit 1150, as well as supporting the touch input device 1100-1. Since the touch sensor 1110 and/or the one or more contacts 360-C may be used as an antenna radiator, the touch sensor 1110 and/or the contacts 360-C may have a variety of shapes for adjusting the resonant characteristic of the antenna device 1100-2.

The matching circuit 1150 may be a circuit element that includes at least one of an inductor and a capacitor.

The matching circuit 1150 may be a circuit element that connects an inductor or capacitor in series or in parallel.

The matching circuit 1150 may be a circuit element that connects an inductor in series and a capacitor in parallel, or may be a circuit element that connects an inductor in parallel and a capacitor in series.

The matching circuit 1150 may include at least one of a low pass filter (LPF), a high pass filter (HPF), a band pass filter (BPF), a band rejection filter (BEF).

The electronic device 1100 may include various other elements. For example, the electronic device 1100 may further include a memory, a sensor module, an input device, a display, an audio module, a camera module, etc., which are not illustrated in the drawing.

Figure 12:
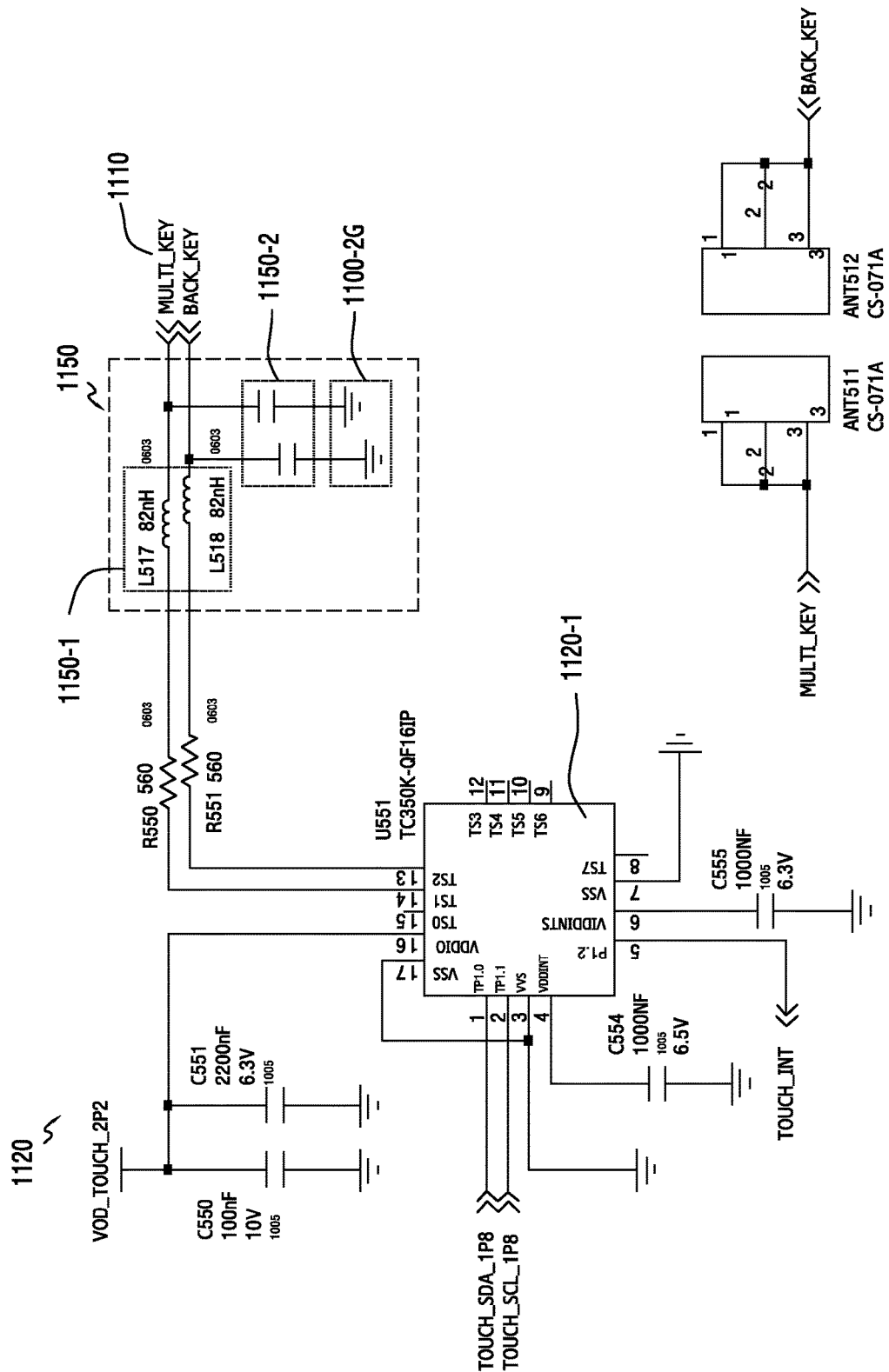
FIGS. 12 to 14 are diagrams illustrating a touch input circuit and a matching circuit, according to an embodiment of the present disclosure.
Figure 13:
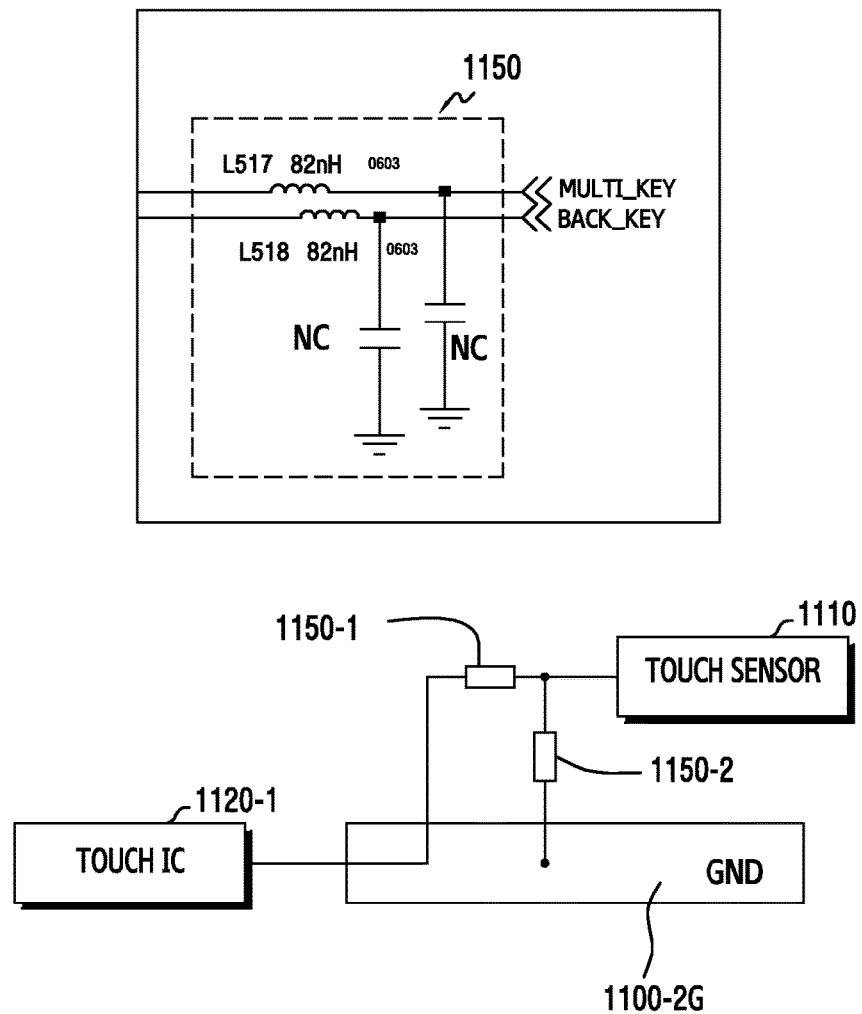
Figure 14:
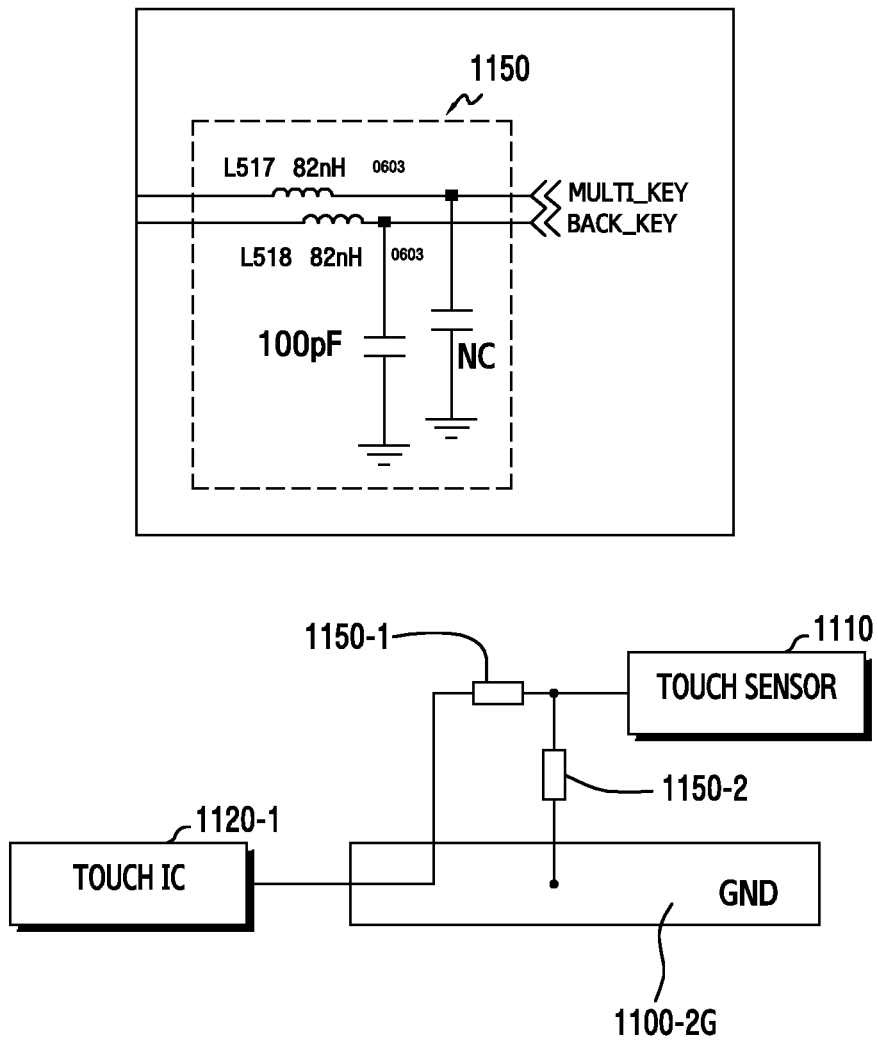

FIGS. 12 to 14 illustrate the touch input circuit 1120 and the matching circuit 1150, according to an embodiment of the present disclosure.

Referring to FIGS. 12 to 14, the touch input circuit 1120 may be, for example, an element that electrically connects a touch Integrated Circuit (IC) 1120-1 and at least one touch sensor 1110. The touch IC 1120-1 may receive a signal relating to a variation in capacitance from the at least one touch sensor 1110 to identify the presence or absence of a touch input and may transfer the touch input to a processor (the processor 1160 of FIG. 11).

The matching circuit 1150 may include a circuit element that electrically connects the at least one touch sensor 1110 and/or one or more contacts 360-C to an antenna ground 1100-2G.

Referring to FIG. 13, the matching circuit 1150 may configure a line that electrically connects the at least one touch sensor 1110 and the ground 1100-2G, but devices (such as an inductor, a capacitor, etc.) may not be installed on the line (e.g., capacitor not connected (NC)).

Referring to FIG. 14, according to various embodiments, the matching circuit 1150 may include at least one capacitor 1150-2 installed on a line that electrically connects the at least one touch sensor 1110 and the antenna ground 1100-2G. Due to the at least one capacitor 1150-2, a conductive area (e.g., the conductive layer 3402 of FIG. 10) of the at least one touch sensor 1110 may be implemented as an antenna radiator for an antenna device 1100-2.

The matching circuit 1150 may further include at least one inductor 1150-1 installed on a line that electrically connects the touch IC 1120-1 and the at least one touch sensor 1110. For example, due to the at least one inductor 1150-1, the conductive area (e.g., the conductive layer 3402 of FIG. 10) of the at least one touch sensor 1110 may be implemented as if it is open at a high frequency, which makes it possible to reduce the interference between a touch input device 1100-1 (e.g., the at least one touch sensor 1110) and the antenna device 1100-2 (e.g., at least one antenna radiator 1130).

Figure 15:
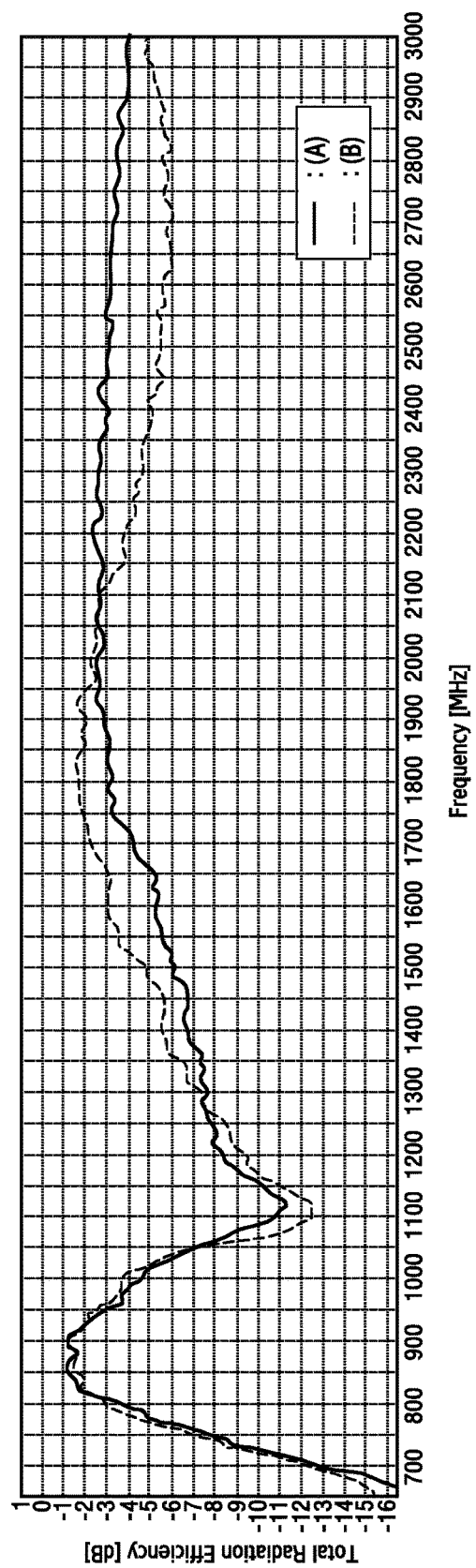
FIG. 15 is a graph of radiation efficiency of an antenna device when the matching circuit is applied, according to the various embodiments of the present disclosure.

FIG. 15 is a graph of radiation efficiency of the antenna device 1100-2 when the matching circuit is applied, according to the various embodiments of the present disclosure.

As can be seen from (A), which represents a case where the matching circuit 1150 of FIG. 13, is applied, it is possible to improve the isolation between the touch input device 1100-1 and the antenna device 1100-2 and to maintain the radiation efficiency of the antenna device 1100-2.

As can be seen from (B), which represents a case where the matching circuit 1150 of FIG. 14, is applied, the touch sensor 1110 of the touch input device 1100-1 may be used as an antenna radiator for supporting the antenna device 1100-2, which makes it possible to improve the radiation efficiency of the antenna device 1100-2.

Comparing (A), which represents the case where the matching circuit 1150 of FIG. 13 is applied, with (B), which represents the case where the matching circuit 1150 of FIG. 14 is applied, substantially similar radiation efficiency may be provided over the entire band.

Figure 16:
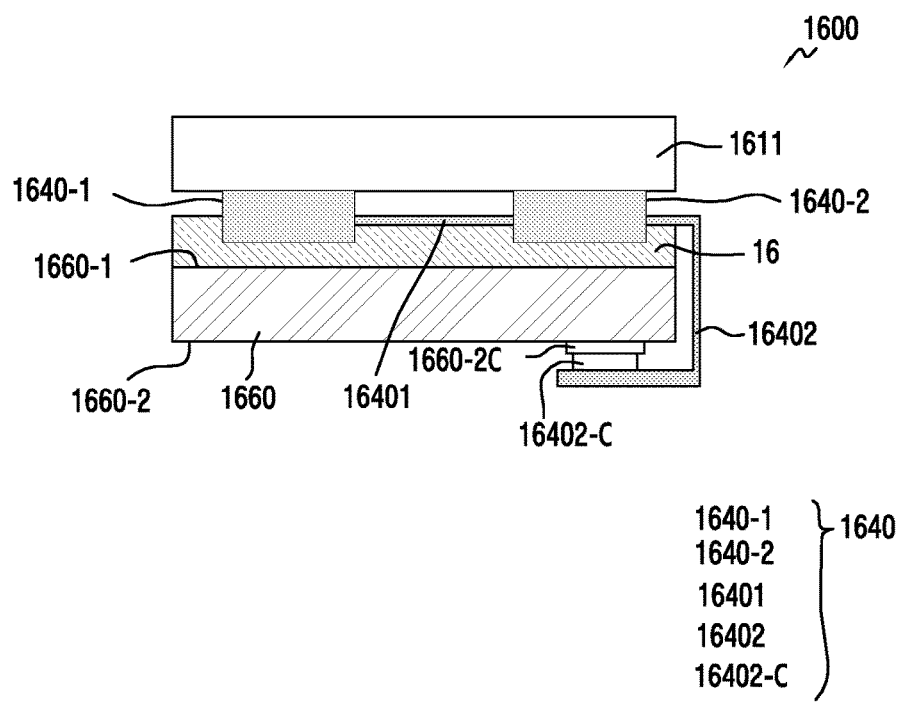
FIG. 16 is a diagram illustrating a configuration of a conventional electronic device.

FIG. 16 is a diagram of an electronic device in the related art.

Referring to FIG. 16, the electronic device 1600, according to the related art, may include a window 1611, a touch key FPCB 1640, a bracket 16, and a circuit board 1660.

The bracket 16 may be disposed between the window 1611 and the circuit board 1660. The circuit board 1660 may include a first side (or surface) 1660-1 directed toward the window 1611 and a second side (or surface) 1660-2 disposed opposite to the first side 1660-1. The bracket 16 may be coupled to the first side 1660-1 of the circuit board 1660. The bracket 16 may overlap almost the entire window 1611.

The touch key FPCB 1640 may include a first portion disposed between the window 1611 and the bracket 16 and a second portion that extends from the first portion, and is electrically connected to the second side 1660-2 of the circuit board 1660. The first portion of the touch key FPCB 1640 may include a first touch key 1640-1, a second touch key 1640-2, and a first connecting portion 16401 that electrically connects the first touch key 1640-1 and the second touch key 1640-2. Here, the bracket 16 may serve to support the first portion of the touch key FPCB 1640. One end of the second portion of the touch key FPCB 1640 may be connected to the first portion of the touch key FPCB 1640, and a connector 16402-C that is electrically connected to a connector 1660-2C mounted on the second side 1660-2 of the circuit board 1660 may be provided on the other end of the second portion of the touch key FPCB 1640.

The electronic device 1600, additionally includes the bracket 16 for supporting the touch key FPCB 1640, whereas the present disclosure do not include the same, and can therefore achieve a reduction in material and simplification of the structure, compared with the electronic device 1600 according to the related art.

While the touch key FPCB 1640 of the electronic device 1600, includes the plurality of components (the first touch key 1640-1, the second touch key 1640-2, the first connecting portion 16401, the connector 16402-C, etc.) as described above, the present disclosure simplifies the structure of the key to achieve a reduction in cost.

The touch key FPCB 1640 of the electronic device 1600, has a substantially long electrical line shape, so the touch key FPCB 1640 is likely to malfunction due to the effect of external noise. As opposed to the related art, the present disclosure may reduce an effect of external noise by simplifying the structure of the key.

The touch key FPCB 1640 of the electronic device 1600, has a substantially long electrical line shape, so the antenna performance of the antenna device mounted in the electronic device 1600 may be degraded by the touch key FPCB 1640. In contrast, the present disclosure may reduce a degradation in the antenna performance of the antenna device by simplifying the structure of the key.

The electronic device 1100, may further reduce a degradation in the performance of the antenna device 1100-2 by additionally configuring the matching circuit 1150 in the touch input device 1100-1 that uses the touch sensor 1110.

Figure 17:
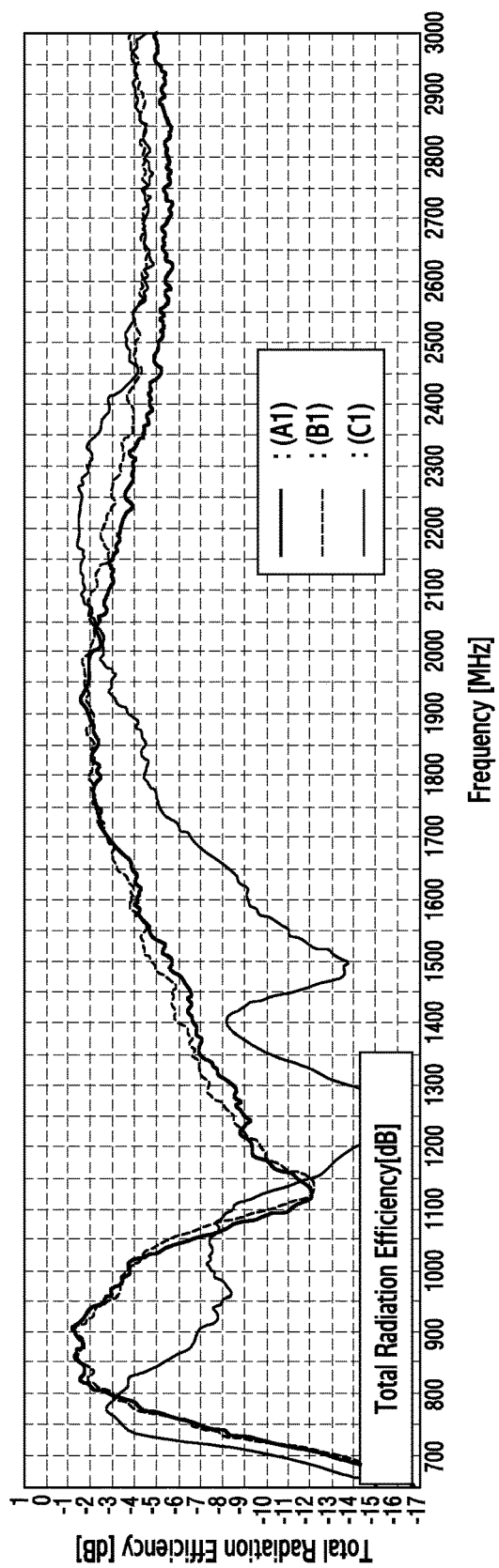
FIG. 17 is a graph of radiation efficiency of the electronic device, from which a touch sensor is removed, and the electronic device according to the related art, according to the embodiment of the present disclosure.
Figure 18:
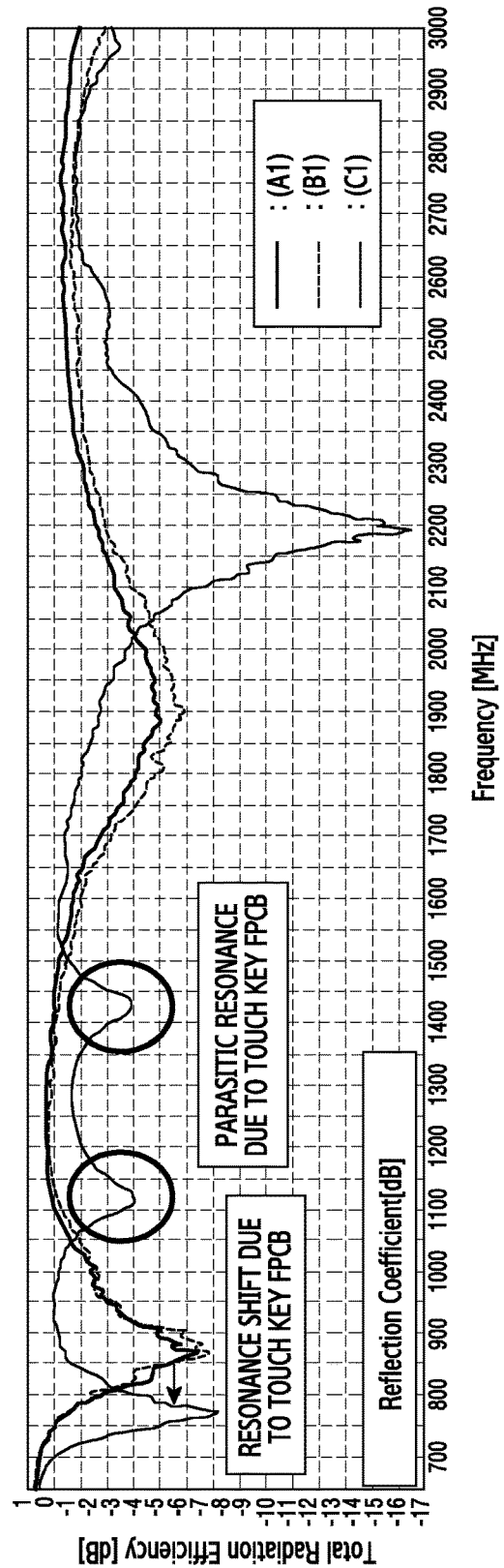
FIG. 18 is a graph of reflection coefficients of the electronic device, from which a touch sensor is removed, and the electronic device according to the related art, according to the embodiment of the present disclosure.

FIG. 17 is a graph of radiation efficiency of the electronic device 1100, from which the touch sensor 1110 is removed, and the electronic device 1600 according to the related art, according to the embodiment of the present disclosure. FIG. 18 is a graph of reflection coefficients of the electronic device 1100, from which the touch sensor 1110 is removed, and the electronic device 1100 according to the related art, according to the embodiment of the present disclosure.

Referring to FIGS. 17 and 18, over the entire band, A1 and A2 that represent the radiation efficiency and reflection coefficient of the electronic device 1100, respectively, which uses the matching circuit 1150, according to the embodiment of the present disclosure, may be substantially similar to B1 and B2 that represent the radiation efficiency and reflection coefficient of the electronic device 1100, respectively, from which the touch sensor 1110 is removed.

In contrast, C1 and C2 that represent the radiation efficiency and reflection coefficient of the electronic device 1600, respectively, according to the related art, may be degraded compared with those in the embodiments of the present disclosure. For example, a shift in resonance may occur by the touch key FPCB 1640 of the electronic device 1600, according to the related art, so that the performance of the antenna device may be degraded. For example, parasitic resonance may occur by the touch key FPCB 1640 of the electronic device 1600, according to the related art, so that the performance of the antenna device may be degraded.

Figure 19:
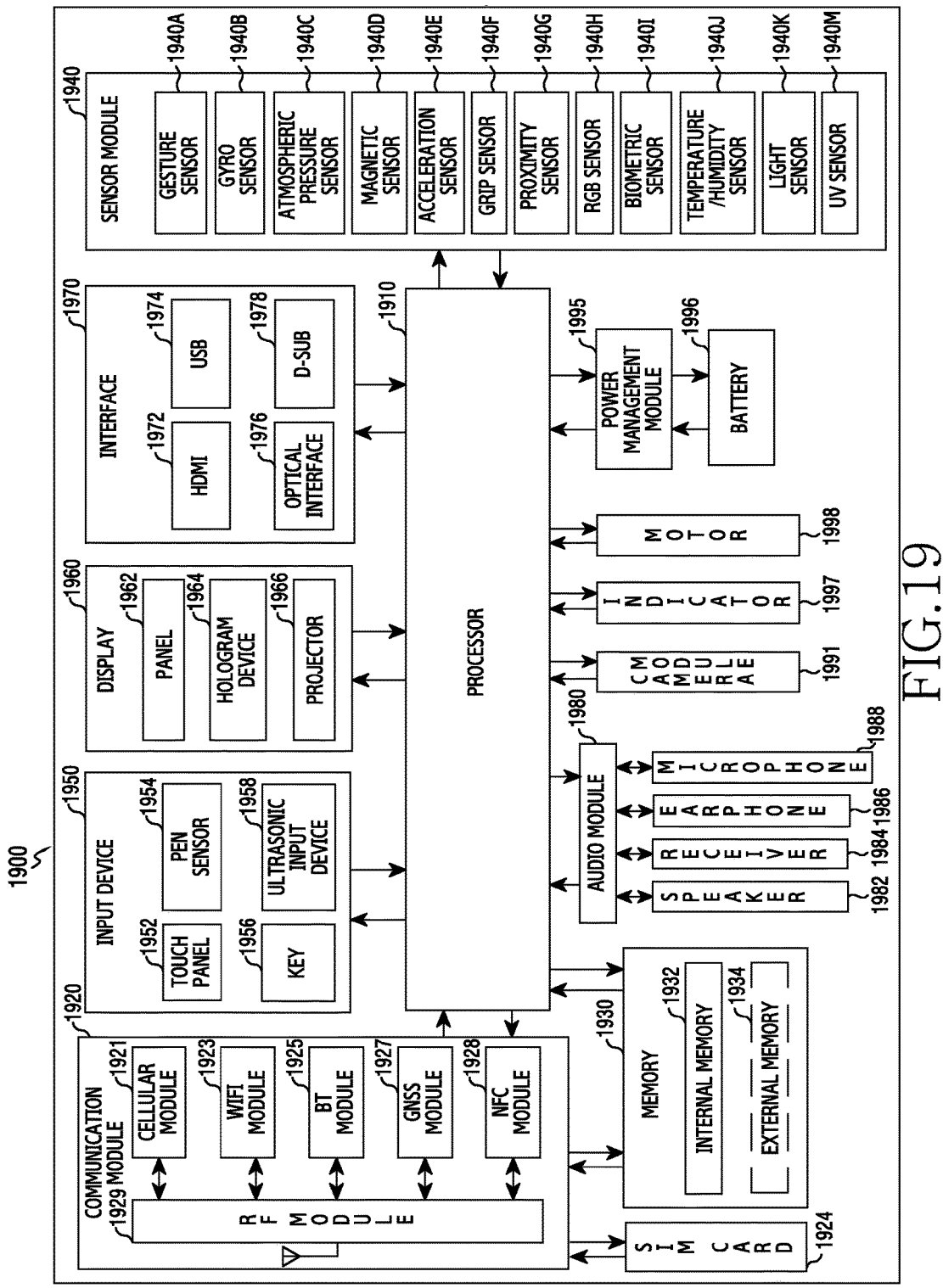
FIG. 19 is a diagram of an electronic device, according to an embodiment of the present disclosure.

FIG. 19 is a diagram of an electronic device, according to an embodiment of the present disclosure.

The electronic device 1900 may include, for example, the entirety or a part of the electronic device 300 illustrated in FIG. 3. The electronic device 1900 may include at least one processor (e.g., application processor (AP)) 1910, a communication module 1920, a subscriber identification module (SIM) 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may drive, for example, an operating system or application programs to control a plurality of hardware or software elements connected thereto and to perform various types of data processing and operations. The processor 1910 may be implemented as, for example, a system on chip (SoC). The processor 1910 may further include a graphic processing unit (GPU) and/or an image signal processor. The processor 1910 may be the processor 1160 of FIG. 11.

The communication module 1920 may include, for example, a cellular module 1921, a WiFi module 1923, a Bluetooth module 1925, a GNSS module 1927 (e.g., a GPS module, a Glonass module, a Beidou module, or a Galileo module), an NFC module 1928, and a radio frequency (RF) module 1929. The communication module 1920 may include the communication circuit 1140 of FIG. 11.

The cellular module 1921 may provide, for example, a voice call, a video call, a text message service, an Internet service, etc. through a communication network. The cellular module 1921 may identify and authenticate the electronic device 1900 in the communication network using the SIM 1924. The cellular module 1921 may perform at least some of the functions that the processor 1910 may provide. The cellular module 1921 may include a communication processor (CP).

The WiFi module 1923, the Bluetooth module 1925, the GNSS module 1927, or the NFC module 1928 may include, for example, a processor for processing data that is transmitted and received through the corresponding module. At least some (two or more) of the cellular module 1921, the WiFi module 1923, the Bluetooth module 1925, the GNSS module 1927, and the NFC module 1928 may be included in a single integrated chip (IC) or IC package.

The RF module 1929 may transmit/receive, for example, a communication signal (e.g., an RF signal). The RF module 1929 may include, for example, a transceiver, a power amp module (PAM), a frequency filter, a low noise amplifier (LNA), an antenna, etc. At least one of the cellular module 1921, the WiFi module 1923, the Bluetooth module 1925, the GNSS module 1927, and the NFC module 1928 may transmit/receive an RF signal through a separate RF module.

The SIM 1924 may include a card having an embedded SIM, and may contain unique identification information (e.g., an integrated circuit card identifier (ICCID)) or subscriber information (e.g., an international mobile subscriber identity (IMSI)).

The memory 1930 may include, for example, an internal memory 1932 or an external memory 1934. The internal memory 1932 may include, for example, at least one of a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard disc drive, a solid state drive (SSD), etc.).

The external memory 1934 may further include a flash drive, which may be, for example, a compact flash (CF), a secure digital (SD), a micro secure digital (Micro-SD), a mini secure digital (Mini-SD), an eXtreme digital (xD), a multimediacard (MMC), a memory stick, etc. The external memory 1934 may be functionally and/or physically connected to the electronic device 1900 through various interfaces.

The sensor module 1940 may, for example, measure a physical quantity or detect the operation state of the electronic device 1900, and may convert the measured or detected information into an electrical signal. The sensor module 1940 may include, for example, at least one of a gesture sensor 1940A, a gyro sensor 1940B, a barometer 1940C, a magnetic sensor 1940D, an acceleration sensor 1940E, a grip sensor 1940F, a proximity sensor 1940G, a color sensor 1940H (e.g., a red/green/blue (RGB) sensor), a medical sensor 1940I, a temperature-humidity sensor 1940J, an illuminance sensor 1940K, and an ultra violet (UV) sensor 1940M. Additionally or alternatively, the sensor module 1940 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a fingerprint scan sensor. The sensor module 1940 may further include a control circuit for controlling the one or more sensors included therein. The electronic device 1900 may further include a processor, which is configured to control the sensor module 1940, as a part of, or separately from, the processor 1910 to control the sensor module 1940 while the processor 1910 is in a sleep state.

The input device 1950 may include, for example, a touch panel 1952, a (digital) pen sensor 1954, a key 1956, or an ultrasonic input unit 1958. The touch panel 1952 may use, for example, at least one of a capacitive type, a resistive type, an infrared type, and an ultrasonic type. Also, the touch panel 1952 may further include a control circuit. The touch panel 1952 may further include a tactile layer to provide a tactile reaction to a user.

The input device 1950 may include the key input device that is implemented as at least one element of FIGS. 3 to 10.

The (digital) pen sensor 1954 may include, for example, a recognition sheet that is a part, or separate from, the touch panel. The key 1956 may include, for example, a physical button, an optical key, or a keypad. The ultrasonic input device 1958 may detect ultrasonic waves, which are generated by an input tool, through a microphone 1988 and may identify data corresponding to the detected ultrasonic waves.

The display 1960 may include a panel 1962, a hologram device 1964, or a projector 1966. The panel 1962 may include a configuration that is the same as, or similar to, that of the display 313 of FIG. 4. The panel 1962 may be implemented to be, for example, flexible, transparent, or wearable. The panel 1962, together with the touch panel 1952, may be configured as a single module. The hologram device 1964 may show a three-dimensional image in the air using an interference of light. The projector 1966 may display images by projecting light to a screen. The screen may be located, for example, inside or outside the electronic device 1900. The display 1960 may further include a control circuit for controlling the panel 1962, the hologram device 1964, or the projector 1966. The display 1960 may be the display 313 of FIG. 4.

The interface 1970 may include, for example, a high-definition multimedia interface (HDMI) 1972, a universal serial bus (USB) 1974, an optical interface 1976, or a d-subminiature (D-sub) 1978. Additionally or alternatively, the interface 1970 may include, for example, a mobile high-definition link (MHL) interface, a secure digital (SD) card/multi-media card (MMC) interface, or an infrared data association (IrDA) standard interface.

The audio module 1980 may convert a sound into an electrical signal, and vice versa. The audio module 1980 may process sound information that is input or output through, for example, a speaker 1982, a receiver 1984, earphones 1986, the microphone 1988, etc.

The camera module 1991 is, for example, a device that can photograph a still image and a video. The camera module 1991 may include one or more image sensors (e.g., a front sensor or a back sensor), a lens, an image signal processor (ISP), or a flash (e.g., a light emitting diode (LED) or xenon lamp).

The power management module 1995 may manage, for example, the power of the electronic device 1900. The power management module 1995 may include a power management integrated circuit (PMIC), a charger integrated circuit (IC), or a battery 1996 gauge. The PMIC may have a wired and/or wireless charging scheme. Examples of the wireless charging method may include a magnetic resonance method, a magnetic induction method, an electromagnetic wave method, etc., and additional circuits (e.g., a coil loop, a resonance circuit, a rectifier, etc.) for wireless charging may be further included. The battery gauge may measure, for example, the residual quantity of the battery 1996 and a voltage, current, or temperature while charging. The battery 1996 may include, for example, a rechargeable battery and/or a solar battery.

The indicator 1997 may indicate a specific state (e.g., a booting state, a message state, a charging state, etc.) of the electronic device 1900 or a part thereof. The motor 1998 may convert an electrical signal into a mechanical vibration, and may generate a vibration, a haptic effect, etc. Although not illustrated, the electronic device 1900 may include a processing unit (e.g., a GPU) for supporting mobile TV. The processing unit for supporting the mobile TV may process media data according to a standard, such as digital multi-media broadcasting (DMB), digital video broadcasting (DVB), MediaFlo™, etc.

According to an embodiment of the present disclosure, an electronic device may include: a housing that includes a window configured to form a first side (or surface) of the electronic device and a second side (or surface) that is opposite to the first side; a touch sensor configured to be close to the window and to generate capacitance; an input circuit configured to detect an input based on a variation in the capacitance while being electrically connected to the touch sensor; an antenna radiator at least partially disposed inside the housing and/or in at least a part of the housing; a ground disposed between the first side and the second side; a communication circuit electrically connected to the antenna radiator and the ground; and an antenna matching circuit electrically connected to the touch sensor and the input circuit.

The antenna matching circuit may include at least one inductor that is electrically connected between the touch sensor and the input circuit.

The antenna matching circuit may constitute a line that is electrically connected between the touch sensor and the ground.

The antenna matching circuit may include at least one capacitor that is mounted on the line.

The antenna matching circuit may be constituted by connecting at least one inductor and/or at least one capacitor in series or in parallel.

The touch sensor may be constituted by a plate that includes a conductive pattern.

The electronic device may further include a contact configured to electrically connect the touch sensor and the input circuit, and the contact may be configured to make contact with the touch sensor while being resiliently deformed.

The contact may include a C-clip.

The electronic device may further include a PCB on which the input circuit is mounted, and the touch sensor may be mounted on the printed circuit board using the SMT.

The touch sensor may include a plurality of conductive patterns, and the plurality of conductive patterns may be arranged close to the window while being physically separated therefrom. The electronic device may further include a plurality of contacts configured to electrically connect the input circuit and the plurality of conductive patterns.

The electronic device may further include a PCB on which the input circuit is mounted. The printed circuit board may be disposed to overlap the window in the direction from the first side to the second side. The plurality of contacts may be disposed between the window and the printed circuit board and may be mounted on the printed circuit board while being physically separated therefrom.

The antenna radiator may be configured to overlap the touch sensor in the direction from the first side to the second side.

The ground may be disposed between the touch sensor and the antenna radiator.

The electronic device may further include a PCB, and the ground may be a part of the PCB.

The electronic device may further include a display exposed through the first side of the housing.

An electronic device may include: a housing that includes a window configured to form a first side of the electronic device and a second side that is opposite to the first side; a circuit board that is disposed between the first side and the second side and includes a ground; a first conductive plate and a second conductive plate that are disposed between the first side and the circuit board and are arranged close to the window while being physically separated therefrom; an input circuit configured to detect a first input based on a variation in the capacitance of the first conductive plate and to detect a second input based on a variation in the capacitance of the second conductive plate, and is mounted on the circuit board; a first contact and a second contact, the first contact being configured to electrically connect the input circuit and the first conductive plate and to be mounted on the circuit board and the second contact being configured to electrically connect the input circuit and the second conductive plate and to be mounted on the circuit board; an antenna radiator at least partially disposed inside the housing and/or in at least a part of the housing; a communication circuit electrically connected to the antenna radiator and the ground and mounted on the circuit board; and an antenna matching circuit electrically connected to at least one of the first and second conductive plates and the input circuit and mounted on the circuit board.

The electronic device may further include: a through-hole formed through the window; a button inserted into the through-hole so as to be pressed in the direction from the first side to the second side; and a push switch mounted on the circuit board and supplied with a current by the press of the button. The push switch may be disposed between the first contact and the second contact.

Figure 20:
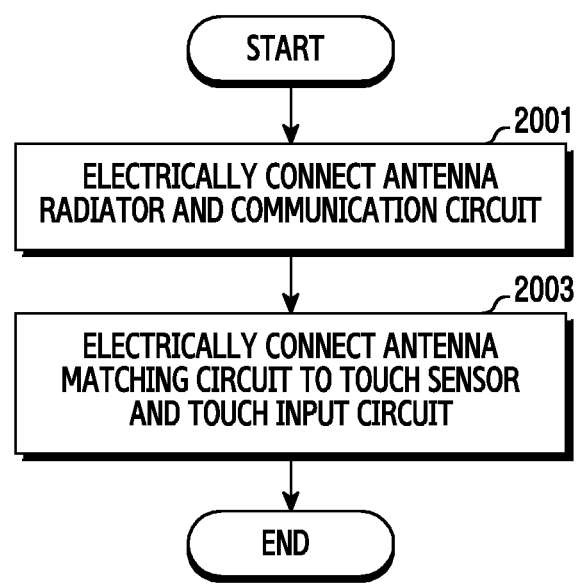
FIG. 20 is a flowchart of a method of an operating procedure of an electronic device, according to an embodiment of the present disclosure.

FIG. 20 is a flowchart of a method for operating the electronic device 1100, according to an embodiment of the present disclosure.

Referring to FIG. 20, in step 2001, the electronic device 1100 may electrically connect the antenna radiator 1130 and the communication circuit 1140.

In step 2003, the electronic device 1100 may electrically connect the antenna matching circuit 1150 to the touch sensor 1110 and the touch input circuit 1120. The touch sensor 1110 may be electrically connected to the touch input circuit 1120 through the antenna matching circuit 1150.

The matching circuit 1150 may improve the isolation between the touch input device 1110-1 and the antenna device 1100-2. For example, the antenna performance of the at least one antenna radiator 1130 may not be degraded by the touch sensor 1110 and/or the one or more contacts 360-C around the antenna radiator 1130.

The matching circuit 1150 may be configured such that at least a part of the touch input device 1110-1 supports the operation of the antenna device 1100-2. For example, the touch sensor 1110 and/or the one or more contacts 360-C of FIG. 10 may also serve as an antenna radiator for supporting the antenna device 1100-2 by the matching circuit 1150, as well as supporting the touch input device 1100-1.

Each of the above-described component elements of hardware according to the present disclosure may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
 a housing including a window that forms a first side of the electronic device, and a second side that is disposed opposite to the first side;
 a touch input device including:
   a touch sensor disposed adjacent to the window and configured to generate a capacitance,
   an input circuit operably connected to the touch sensor and configured to detect an input based on a variation in the capacitance,
   an antenna matching circuit operably connected to the touch sensor and the input circuit, and
   a contact electrically connecting the touch sensor to the input circuit;
 and
 an antenna device including;

an antenna radiator at least one of partially disposed inside the housing and a part of the housing, a ground operably disposed between the first side and the second side, and a communication circuit operably connected to the antenna radiator and the ground, wherein the contact is to contact the touch sensor while being deformed.

2. The electronic device of claim 1, wherein the antenna matching circuit comprises at least one inductor that is operably connected between the touch sensor and the input circuit.

3. The electronic device of claim 2, wherein the antenna matching circuit comprises a line that is electrically connected between the touch sensor and the ground.

4. The electronic device of claim 3, wherein the antenna matching circuit comprises at least one capacitor that is mounted on the line.

5. The electronic device of claim 1, wherein the antenna matching circuit is established by connecting at least one inductor and at least one capacitor in one of a series and a parallel configuration.

6. The electronic device of claim 1, wherein the touch sensor includes a plate having a conductive pattern.

7. The electronic device of claim 1, wherein the contact comprises a C-clip.

8. The electronic device of claim 1, further comprising:
a printed circuit board (PCB) on which the input circuit is mounted,
wherein the touch sensor is mounted on the printed circuit board using a surface mounting technology (SMT).

9. The electronic device of claim 1, wherein the touch sensor comprises a plurality of conductive patterns which are arranged adjacent to and spaced apart from the window, and wherein the electronic device further comprises a plurality of contacts that are configured to electrically connect the input circuit to the plurality of conductive patterns.

10. The electronic device of claim 9, further comprising:
a PCB on which the input circuit is mounted,
wherein the PCB overlaps the window in a direction from the first side of the electronic device to the second side of the electronic device, and the plurality of contacts are disposed between the window and the PCB and are mounted to the PCB spaced apart therefrom.

11. The electronic device of claim 1, wherein the antenna radiator overlaps the touch sensor in a direction from the first side of the electronic device to the second side of the electronic device.

12. The electronic device of claim 11, wherein the ground is disposed between the touch sensor and the antenna radiator.

13. The electronic device of claim 1, wherein the electronic device further comprises a PCB, and the ground is a part of the PCB.

14. The electronic device of claim 1, further comprising:
a display extending through the first side of the housing.

15. An electronic device comprising:
a housing that includes a window that forms a first side of the electronic device, and a second side of the electronic device that is disposed opposite to the first side;
a circuit board operably disposed between the first side of the electronic device and the second side of the electronic device and including a ground;
a touch input device including:
a first conductive plate and a second conductive plate that are operably disposed between the first side of the electronic device and the circuit board and that are disposed adjacent to and spaced apart from the window,
an input circuit mounted on the circuit board and configured to detect a first input based on a variation in a capacitance of the first conductive plate and to detect a second input based on a variation in a capacitance of the second conductive plate,
a first contact and a second contact, the first contact mounted on the circuit board and configured to electrically connect the input circuit and the first conductive plate and the second contact mounted on the circuit board and configured to electrically connect the input circuit and the second conductive plate, and
an antenna matching circuit mounted on the circuit board and operably connected to at least one of the first conductive plate and the second conductive plate and the input circuit; and
an antenna device including:
an antenna radiator at least one of partially disposed inside the housing and a part of the housing, and
a communication circuit mounted on the circuit board and operably connected to the antenna radiator and the ground.

16. The electronic device of claim 15, further comprising:
a through-hole formed through the window;
a button disposed within the through-hole and extending from the first side of the electronic device to the second side of the electronic device; and
a push switch mounted on the circuit board and configured to receive current by the press of the button,
wherein the push switch is operably disposed between the first contact and the second contact.

* * * * *